United States Patent
Yokoyama et al.

(10) Patent No.: US 12,351,055 B2
(45) Date of Patent: Jul. 8, 2025

(54) VEHICLE CONTROL DEVICE FOR PROHIBITING LANE CHANGING, VEHICLE CONTROL METHOD FOR PROHIBITING LANE CHANGING, AND NON-TRANSITORY RECORDING MEDIUM

(71) Applicant: TOYOTA JIDOSHA KABUSHIKI KAISHA, Aichi-ken (JP)

(72) Inventors: Daiki Yokoyama, Gotemba (JP); Toshiya Hashimoto, Miyoshi (JP); Shuntaro Okazaki, Shizuoka-ken (JP); Shogo Tsuge, Fuji (JP); Kazuhisa Matsuda, Shizuoka-ken (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 266 days.

(21) Appl. No.: 17/855,657

(22) Filed: Jun. 30, 2022

(65) Prior Publication Data
US 2023/0001813 A1    Jan. 5, 2023

(30) Foreign Application Priority Data

Jul. 1, 2021  (JP) ................... 2021-110222

(51) Int. Cl.
*B60W 10/26*  (2006.01)
*B60L 53/12*  (2019.01)
(Continued)

(52) U.S. Cl.
CPC ............ *B60L 53/36* (2019.02); *B60L 53/12* (2019.02); *B60L 53/38* (2019.02); *B60L 58/12* (2019.02);
(Continued)

(58) Field of Classification Search
CPC ........ B60L 53/36; B60L 53/12; B60L 53/38; H02J 50/10; H02J 50/40; B60W 30/12;
(Continued)

(56) References Cited

U.S. PATENT DOCUMENTS

| | | | |
|---|---|---|---|
| 2002/0005778 A1* | 1/2002 | Breed | G02B 27/01 340/436 |
| 2019/0039470 A1* | 2/2019 | Moghe | B60L 53/00 |

(Continued)

FOREIGN PATENT DOCUMENTS

| | | |
|---|---|---|
| JP | 2018157686 A | 10/2018 |
| JP | 2020-194197 A | 12/2020 |

OTHER PUBLICATIONS

"Formal verification of autonomous vehicle platooning"—Kamali et al. (Year: 2017).*

(Continued)

*Primary Examiner* — Scott A Browne
*Assistant Examiner* — Rami Nabih Bedewi
(74) *Attorney, Agent, or Firm* — HAUPTMAN HAM, LLP

(57) ABSTRACT

The vehicle control device controls a vehicle configured to receive power by non-contact from a power transmission coil when passing over the power transmission coil. The vehicle control device includes a processor configured to prohibit lane changing by the vehicle in a predetermined range up to an end point of a power supply area where the power transmission coil is installed when the vehicle is running in a lane of the power supply area.

18 Claims, 19 Drawing Sheets

(51) Int. Cl.
- *B60L 53/36* (2019.01)
- *B60L 53/38* (2019.01)
- *B60L 58/12* (2019.01)
- *B60W 30/12* (2020.01)
- *B60W 30/165* (2020.01)
- *B60W 30/18* (2012.01)
- *B60W 50/14* (2020.01)
- *H02J 50/10* (2016.01)
- *H02J 50/12* (2016.01)
- *H02J 50/40* (2016.01)
- *H02J 50/90* (2016.01)

(52) U.S. Cl.
CPC ...... *B60W 30/12* (2013.01); *B60W 30/18163* (2013.01); *B60W 50/14* (2013.01); *H02J 50/10* (2016.02); *H02J 50/40* (2016.02); *B60W 2510/244* (2013.01); *B60W 2540/20* (2013.01)

(58) Field of Classification Search
CPC ........... B60W 30/18163; B60W 50/14; B60W 2510/244; B60W 2540/20
See application file for complete search history.

(56) References Cited

U.S. PATENT DOCUMENTS

2020/0369269 A1    11/2020  Tanaka et al.
2021/0086649 A1*   3/2021   Nakatsuka .............. B60L 53/39
2021/0107510 A1*   4/2021   Kato ............... B60W 30/18163

OTHER PUBLICATIONS

NPL: Formation Verification of Autonomous Vehicle Platooning—Kamali et al. (Year: 2017).*

* cited by examiner

FIG. 12

ELECTRICITY WILL BE SUPPLIED TO YOUR VEHICLE;
PLEASE REFRAIN FROM LINE REORGANIZATION.

VEHICLE CONTROL DEVICE FOR PROHIBITING LANE CHANGING, VEHICLE CONTROL METHOD FOR PROHIBITING LANE CHANGING, AND NON-TRANSITORY RECORDING MEDIUM

RELATED APPLICATIONS

The present application claims priority of Japanese Patent Application No. 2021-110222 filed Jul. 1, 2021, the disclosure of which is hereby incorporated by reference herein in its entirety.

FIELD

The present disclosure relates to a vehicle control device, a vehicle control method, and a non-transitory recording medium.

BACKGROUND

It has been known in the past to use a transmission method such as a magnetic field resonance method to transmit power by non-contact between a power supply apparatus provided at a ground and a vehicle (for example, PTL 1). By employing this technology, it is possible to supply power by non-contact to a vehicle when the vehicle is passing through a power supply area where a power transmission coil of the power supply apparatus is installed.

CITATION LIST

Patent Literature

[PTL 1] Japanese Unexamined Patent Publication No. 2018-157686

SUMMARY

Technical Problem

However, a driver of a vehicle is liable to change lanes from the lane of the power supply area to an adjacent lane if not aware of the presence of the power supply area etc. If changing lanes at the power supply area, the vehicle will deviate in position away from the power transmission coil in the vehicle width direction and the power supply efficiency will drop. Further, the opportunity to supply power to the vehicle will be lost if changing lanes in a manner that avoids passing through the power supply area.

Therefore, in consideration of the above problem, the object of the present disclosure is to keep the amount of power supplied to a vehicle from dropping due to lane changing when power is being supplied to the vehicle at a power supply area where a power transmission coil is installed.

Solution to Problem

The summary of the present disclosure is as follows.

(1) A vehicle control device for controlling a vehicle configured to receive power by non-contact from a power transmission coil when passing over the power transmission coil, comprising: a processor configured to prohibit lane changing by the vehicle in a predetermined range up to an end point of a power supply area where the power transmission coil is installed when the vehicle is running in a lane of the power supply area.

(2) The vehicle control device described in above (1), wherein the predetermined range includes a range from a start point of the power supply area to an end point of the power supply area.

(3) The vehicle control device described in above (1) or (2), wherein the predetermined range includes a range before the power supply area in a direction of advance of the vehicle.

(4) The vehicle control device described in any one of above (1) to (3), wherein the processor is configured to calculate an SOC of a battery of the vehicle, and the processor is configured to prohibit lane changing by the vehicle in the predetermined range when the SOC is less than a predetermined value and permit lane changing by the vehicle in the predetermined range when the SOC is equal to or greater than the predetermined value.

(5) The vehicle control device described in any one of above (1) to (4), wherein the lane changing by the vehicle is lane changing by manual driving of a driver of the vehicle.

(6) The vehicle control device described in above (5), the processor is configured to prohibit the lane changing by notifying the driver through an output device of the vehicle that lane changing is prohibited.

(7) The vehicle control device described in above (6), wherein the processor is configured to notify the driver through the output device that lane changing is prohibited when detecting operation of a turn signal of the vehicle by the driver.

(8) The vehicle control device described in above (6) or (7), wherein the processor is configured to acquire a positional relationship between the vehicle and a preceding vehicle running forward of the vehicle, and notify the driver through the output device that lane changing is prohibited when a predetermined condition relating to the positional relationship is satisfied.

(9) The vehicle control device described in any one of above (5) to (8), wherein the processor is configured to prohibit lane changing by obstructing operation by the driver for lane changing.

(10) The vehicle control device described in above (9), wherein the operation for lane changing is an operation of a turn signal of the vehicle.

(11) The vehicle control device described in above (9) or (10), wherein the operation for lane changing is turning of a steering wheel of the vehicle.

(12) The vehicle control device described in above (5), wherein the vehicle is a vehicle that is platooning, and the processor is configured to prohibit the lane changing by notifying the driver through the output device of the vehicle that line reorganization is prohibited.

(13) The vehicle control device described in above (12), wherein the processor is configured to notify the driver through the output device that line reorganization is prohibited when the driver has requested line reorganization.

(14) The vehicle control device described in any one of above (1) to (4), wherein the lane changing by the vehicle is lane changing by automated driving.

(15) The vehicle control device described in above (14), wherein the processor is configured to permit lane changing for making a passing maneuver when a predetermined passing condition is satisfied at a position outside the predetermined range, and prohibit lane changing for making a passing maneuver when the passing condition is satisfied in the predetermined range.

(16) The vehicle control device described in above (14), wherein the vehicle is an automated driving vehicle that is platooning, and the processor is configured to permit lane changing for line reorganization when a predetermined reorganization condition is satisfied at a position outside the predetermined range, and prohibit lane changing for line reorganization when the reorganization condition is satisfied in the predetermined range.

(17) A vehicle control method for controlling a vehicle configured to receive power by non-contact from a power transmission coil when passing over the power transmission coil, including: prohibiting lane changing by the vehicle in a predetermined range up to an end point of a power supply area where the power transmission coil is installed when the vehicle is running in a lane of the power supply area.

(18) A non-transitory recording medium having recorded thereon a computer program for controlling a vehicle configured to receive power by non-contact from a power transmission coil when passing over the power transmission coil, wherein the computer program causes a computer to prohibit lane changing by the vehicle in a predetermined range up to an end point of a power supply area where the power transmission coil is installed when the vehicle is running in a lane of the power supply area.

According to the present disclosure, it is possible to keep the amount of power supplied to a vehicle from dropping due to lane changing when power is being supplied to the vehicle at a power supply area where a power transmission coil is installed.

BRIEF DESCRIPTION OF DRAWINGS

FIG. 12 is a view showing one example of text information output from an HMI to notify that line reorganization is prohibited.

DESCRIPTION OF EMBODIMENTS

Figure 1:
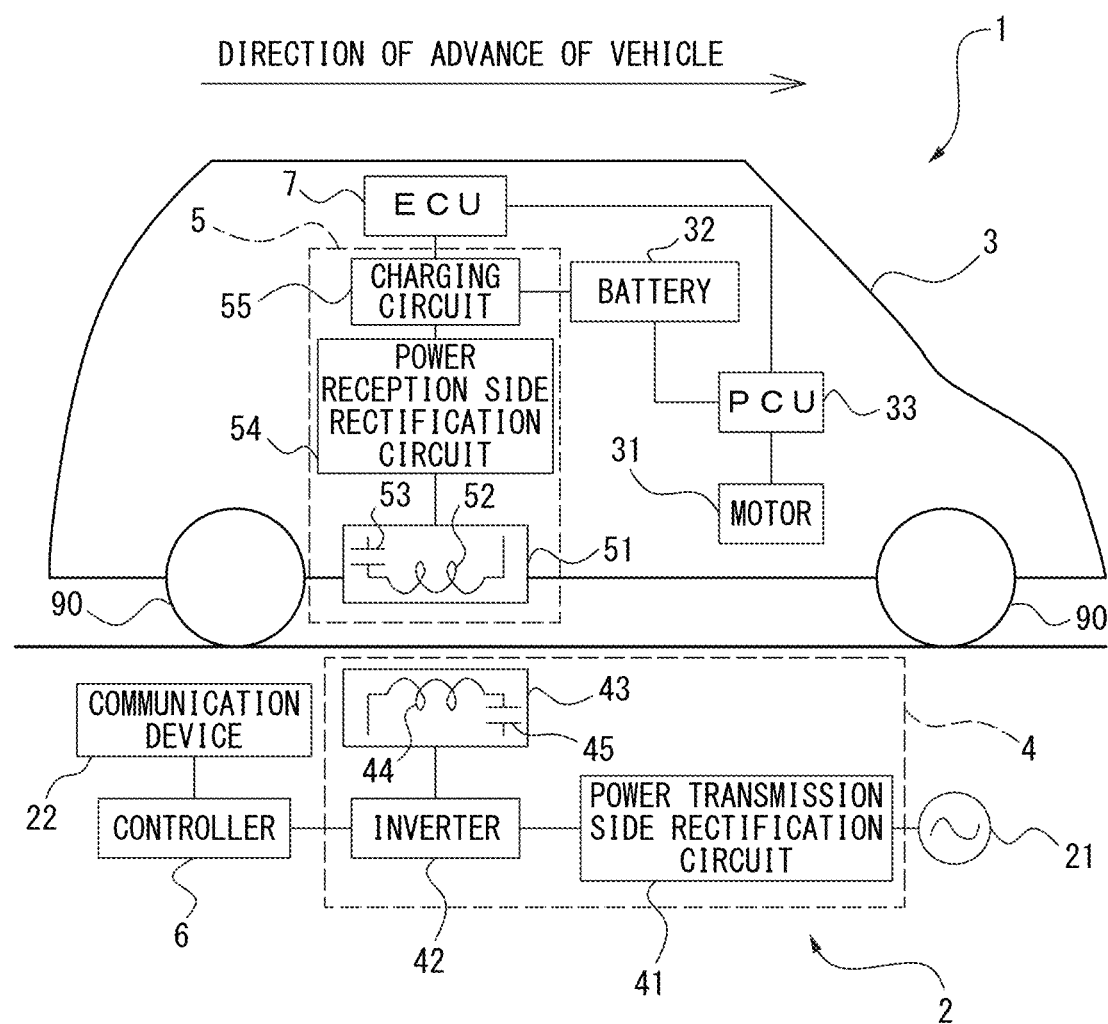
FIG. 1 is a view schematically showing a configuration of a non-contact power supply system.

Below, referring to the drawings, embodiments of the present disclosure will be explained in detail. Note that, in the following explanation, similar component elements will be assigned the same reference notations.

First Embodiment

Below, referring to FIG. 1 to FIG. 7, a first embodiment of the present disclosure will be explained.

First, the configuration for transmitting power from a power supply apparatus provided at the ground to a vehicle will be explained. FIG. 1 is a view schematically showing a configuration of a non-contact power supply system 1. The non-contact power supply system 1 is provided with a power supply apparatus 2 and a vehicle 3 and supplies power by non-contact between the power supply apparatus 2 and the vehicle 3. In particular, in the present embodiment, the non-contact power supply system 1 transmits power by non-contact from the power supply apparatus 2 to the vehicle 3 by magnetic field resonance coupling (magnetic field resonance) when the vehicle 3 is running. That is, the non-contact power supply system 1 transmits power from the power supply apparatus 2 to the vehicle 3 using a magnetic field as a medium. Note that, non-contact power supply is also called non-contact power transfer, wireless power transfer, or wireless power supply.

The power supply apparatus 2 is configured to supply power to the vehicle 3 by non-contact. Specifically, as shown in FIG. 1, the power supply apparatus 2 is provided with a power transmission apparatus 4, a power supply 21, a controller 6, and a communication device 22. In the present embodiment, the power supply apparatus 2 is provided at a road (lane) on which the vehicle 3 runs and, for example, is buried in the ground (under the road surface). Note that, at least a part of the power supply apparatus 2 (for example, the power supply 21, the controller 6, and the communication device 22) may be placed on the road surface.

The power supply 21 is the power source of the power transmission apparatus 4 and supplies power to the power transmission apparatus 4. The power supply 21, for example, is a commercial alternating current power supply supplying single-phase alternating current power. Note that, the power supply 21 may be an alternating current power supply supplying three-phase alternating current power etc.

The power transmission apparatus 4 is configured to generate an alternating current magnetic field for transmitting power to the vehicle 3. In the present embodiment, the power transmission apparatus 4 is provided with a power transmission side rectification circuit 41, an inverter 42, and a power transmission side resonance circuit 43. In the power transmission apparatus 4, suitable alternating current power (high frequency power) is supplied through the power transmission side rectification circuit 41 and the inverter 42 to the power transmission side resonance circuit 43.

The power transmission side rectification circuit 41 is electrically connected to the power supply 21 and the inverter 42. The power transmission side rectification circuit 41 rectifies the alternating current power supplied from the power supply 21 to direct current power and supplies the direct current power to the inverter 42. The power transmission side rectification circuit 41 is, for example, an AC/DC converter.

The inverter 42 is electrically connected to the power transmission side rectification circuit 41 and power transmission side resonance circuit 43. The inverter 42 converts the direct current power supplied from the power transmission side rectification circuit 41 to alternating current power of a frequency higher than the alternating current power of the power supply 21 (high frequency power) and supplies the high frequency power to the power transmission side resonance circuit 43.

The power transmission side resonance circuit 43 has a resonator comprised of a power transmission coil 44 and a power transmission side capacitor 45. The various parameters of the power transmission coil 44 and the power transmission side capacitor 45 (outside diameter and inside diameter of the power transmission coil 44, turns of the power transmission coil 44, electrostatic capacity of the power transmission side capacitor 45, etc.) are determined so that the resonance frequency of the power transmission side resonance circuit 43 becomes a predetermined set value. The predetermined set value is, for example, 10 kHz to 100 GHz, preferably is the 85 kHz determined by the SAE TIR J2954 standard as the frequency band for non-contact power supply of vehicles.

The power transmission side resonance circuit 43 is arranged at the center of the lane over which the vehicle 3 runs so that the center of the power transmission coil 44 is positioned at the center of the lane. If high frequency power supplied from the inverter 42 is applied to the power transmission side resonance circuit 43, the power transmission side resonance circuit 43 generates an alternating current magnetic field for transmitting the power to the vehicle 3. Note that, in the power transmission apparatus 4, the power supply 21 may be a fuel cell or solar cell or other such direct current power supply. In this case, the power transmission side rectification circuit 41 may be omitted.

The controller 6 is, for example, a general use computer and performs various control of the power supply apparatus 2. For example, the controller 6 is electrically connected to the inverter 42 of the power transmission apparatus 4 and controls the inverter 42 so as to control the power transmission by the power transmission apparatus 4.

Figure 2:
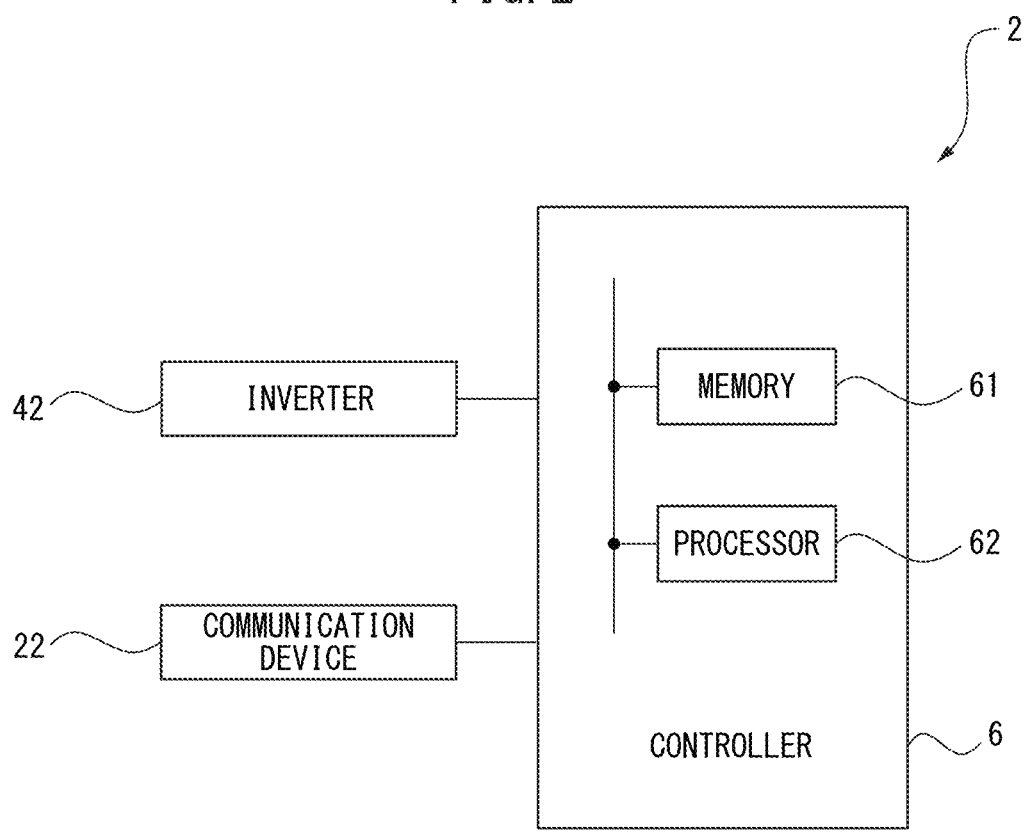
FIG. 2 is a schematic view of a configuration of a controller and equipment connected to the controller.

FIG. 2 is a schematic view of the configuration of the controller 6 and equipment connected to the controller 6. The controller 6 is provided with a memory 61 and a processor 62. The memory 61 and the processor 62 are connected with each other through signal wires. Note that, the controller 6 may be further provided with a communication interface etc. for connecting the controller 6 to a communication network such as the Internet.

The memory 61 has, for example, a volatile semiconductor memory (for example, a RAM) and a nonvolatile semiconductor memory (for example, a ROM). The memory 61 stores programs to be run at the processor 62, various data used when various processing is performed by the processor 62, etc.

The processor 62 has one or more CPUs (central processing units) and their peripheral circuits and performs various processing. Note that, the processor 62 may also have a logic unit or arithmetic unit or other such processing circuit.

The communication device 22 is equipment enabling communication between the power supply apparatus 2 and the outside of the power supply apparatus 2. In the present embodiment, the communication device 22 includes a near field wireless communication module. The communication device 22 is electrically connected to the controller 6. The controller 6 communicates with the vehicle 3 using the communication device 22.

On the other hand, the vehicle 3 is configured to receive power by non-contact from the power transmission coil 44 when passing over the power transmission coil 44 of the power supply apparatus 2. Specifically, as shown in FIG. 1, the vehicle 3 is provided with a power reception apparatus 5, a motor 31, a battery 32, a power control unit (PCU) 33, and an electronic control unit (ECU) 7. In the present embodiment, the vehicle 3 is an electric vehicle (BEV) not mounting an internal combustion engine, and the motor 31 outputs drive power for running use.

The motor 31 is, for example, an alternating current synchronous motor and functions as a motor and a generator. When the motor 31 functions as a motor, the power stored in the battery 32 is used as the source of power for driving it. The output of the motor 31 is transmitted through a decelerator and axle to the wheels 90. On the other hand, at the time of deceleration of the vehicle 3, the motor 31 is driven by rotation of the wheels 90 and the motor 31 functions as a generator to produce regenerated power.

The battery 32 is a rechargeable secondary battery and is, for example, comprised of a lithium ion battery, nickel-hydrogen battery, etc. The battery 32 stores the power required for the vehicle 3 to run (for example, drive power of motor 31). If the regenerated power produced by the motor 31 is supplied to the battery 32, the battery 32 is charged and the state of charge of the battery 32 is restored. Further, the battery 32 can be charged by an outside power supply other than the power supply apparatus 2 through a charging port provided at the vehicle 3.

The PCU 33 is electrically connected to the battery 32 and motor 31. The PCU 33 has an inverter, booster converter, and DC/DC converter. The inverter converts the direct current power supplied from the battery 32 to alternating current power and supplies the alternating current power to the motor 31. On the other hand, the inverter converts the alternating current power generated by the motor 31 (regenerated power) to direct current power and supplies the direct current power to the battery 32. When the power stored in the battery 32 is supplied to the motor 31, the booster converter boosts the voltage of the battery 32 in accordance with need. When the power stored in the battery 32 is supplied to the headlights and other electronic equipment, the DC/DC converter lowers the voltage of the battery 32.

The power reception apparatus 5 is configured to receive power via the alternating current magnetic field emitted from the power transmission apparatus 4. In the present embodiment, the power reception apparatus 5 is provided with a power reception side resonance circuit 51, power reception side rectification circuit 54, and charging circuit 55. The power reception apparatus 5 receives power from the power transmission apparatus 4 and supplies the received power to the battery 32.

The power reception side resonance circuit 51 is arranged at the bottom part of the vehicle 3 so that the distance from the road surface becomes smaller. In the present embodiment, the power reception side resonance circuit 51 is arranged at the center of the vehicle 3 in the vehicle width direction and is arranged between the front wheels 90 and the rear wheels 90 in the front-back direction of the vehicle 3.

The power reception side resonance circuit 51 has a configuration similar to the power transmission side resonance circuit 43 and has a resonator comprised of a power reception coil 52 and a power reception side capacitor 53. The various parameters of the power reception coil 52 and the power reception side capacitor 53 (outside diameter and inside diameter of the power reception coil 52, turns of the power reception coil 52, electrostatic capacity of the power reception side capacitor 53, etc.) are determined so that the resonance frequency of the power reception side resonance circuit 51 matches the resonance frequency of the power transmission side resonance circuit 43. Note that, if the amount of deviation of the resonance frequency of the power reception side resonance circuit 51 and the resonance frequency of the power transmission side resonance circuit 43 is small, for example, the resonance frequency of the power reception side resonance circuit 51 is within a range of ±20% of the resonance frequency of the power transmission side resonance circuit 43, the resonance frequency of the power reception side resonance circuit 51 does not necessarily have to match the resonance frequency of the power transmission side resonance circuit 43.

As shown in FIG. 1, when the power reception side resonance circuit 51 faces the power transmission side resonance circuit 43, if an alternating current magnetic field is generated at the power transmission side resonance circuit 43, the vibration of the alternating current magnetic field is transferred to the power reception side resonance circuit 51 which resonates by the same resonance frequency of the power transmission side resonance circuit 43. As a result, due to electromagnetic induction, an induction current flows to the power reception side resonance circuit 51, and due to the induction current, power is generated at the power reception side resonance circuit 51. That is, the power transmission side resonance circuit 43 transmits power to the power reception side resonance circuit 51 through a magnetic field, and the power reception side resonance circuit 51 receives power from the power transmission side resonance circuit 43 through a magnetic field.

The power reception side rectification circuit 54 is electrically connected to the power reception side resonance circuit 51 and the charging circuit 55. The power reception side rectification circuit 54 rectifies the alternating current power supplied from the power reception side resonance circuit 51 to convert it to direct current power and supplies the direct current power to the charging circuit 55. The power reception side rectification circuit 54 is, for example, an AC/DC converter.

The charging circuit 55 is electrically connected to the power reception side rectification circuit 54 and the battery 32. The charging circuit 55 converts the direct current power supplied from the power reception side rectification circuit 54 to the voltage level of the battery 32 and supplies it to the battery 32. If the power transmitted from the power transmission apparatus 4 is supplied by the power reception apparatus 5 to the battery 32, the battery 32 is charged and the SOC of the battery 32 is restored. The charging circuit 55 is, for example, a DC/DC converter.

The ECU 7 performs various types of control of the vehicle 3. For example, the ECU 7 is electrically connected to the charging circuit 55 of the power reception apparatus 5 and controls the charging circuit 55 to control charging of the battery 32 by the power transmitted from the power transmission apparatus 4. Further, the ECU 7 is electrically connected to the PCU 33 and controls the PCU 33 to control the transmission of power between the battery 32 and vehicle-mounted equipment (for example, the motor 31).

Note that, the ECU 7 may supply the power received from the power transmission apparatus 4 through the power reception apparatus 5 to an electrical load (for example, the motor 31) instead of the battery 32. The ECU 7 is one example of a vehicle control device controlling the vehicle 3.

Figure 3:
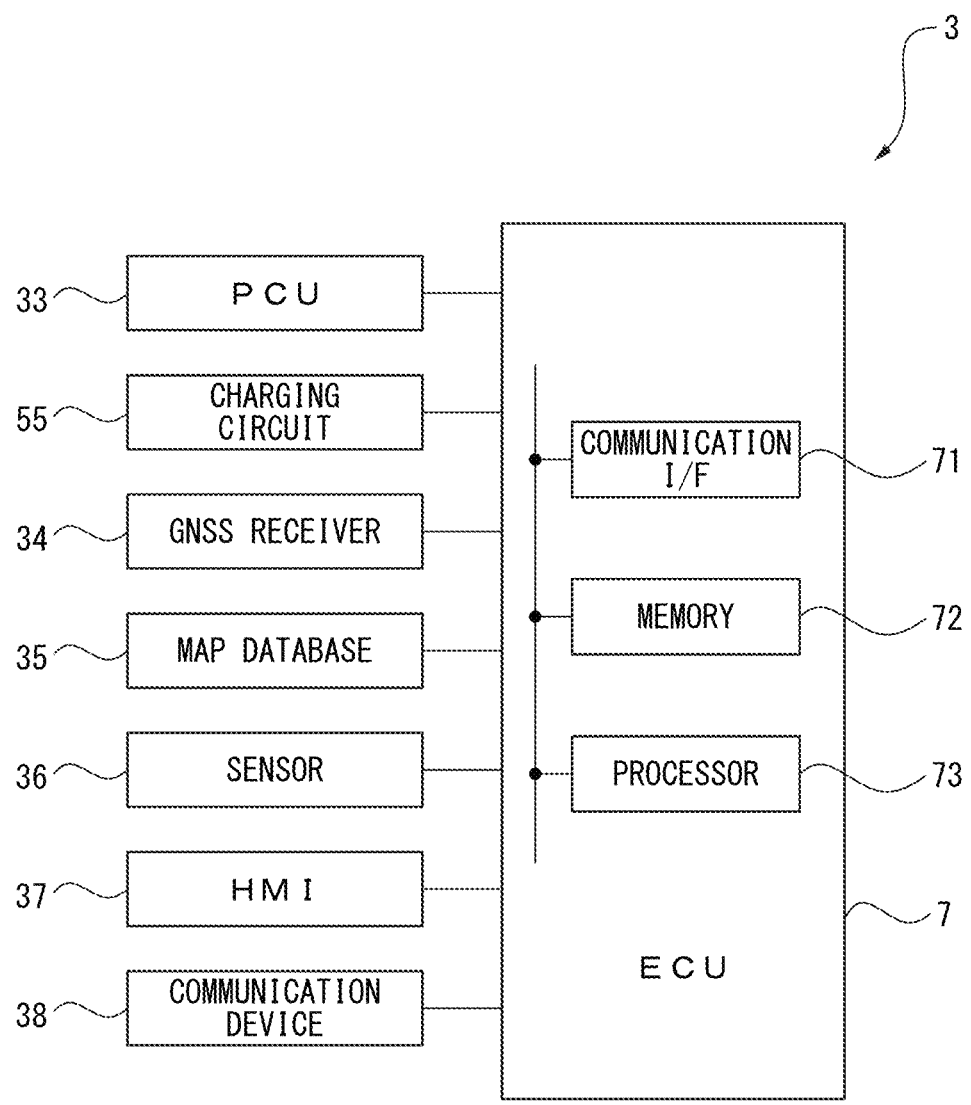
FIG. 3 is a schematic view of a configuration of an ECU of a vehicle according to a first embodiment and equipment connected to the ECU.

FIG. 3 is a schematic view of configuration of the ECU 7 of the vehicle 3 according to the first embodiment and equipment connected to the ECU 7. The ECU 7 has a communication interface 71, a memory 72, and a processor 73. The communication interface 71, the memory 72, and the processor 73 are connected together through signal wires.

The communication interface 71 has an interface circuit for connecting the ECU 7 to an internal vehicle network based on the CAN (Controller Area Network) or other standard.

The memory 72, for example, has a volatile semiconductor memory (for example, RAM) and nonvolatile semiconductor memory (for example, ROM). The memory 72 stores programs to be run at the processor 73, various data used when various processing is performed by the processor 73, etc.

The processor 73 has one or more CPUs (central processing units) and their peripheral circuits and performs various processing. Note that, the processor 73 may also have a logic unit or arithmetic unit or other such processing circuit.

Further, as shown in FIG. 3, the vehicle 3 is further provided with a GNSS receiver 34, a map database 35, sensors 36, a HMI (Human Machine Interface) 37 and a communication device 38. The GNSS receiver 34, the map database 35, the sensors 36, the HMI 37 and the communication device 38 are electrically connected to the ECU 7.

The GNSS receiver 34 detects the current position of the vehicle 3 (for example, a latitude and longitude of the vehicle 3) based on position measurement information obtained from a plurality of (for example, three or more) positioning satellites. Specifically, the GNSS receiver 34 captures a plurality of positioning satellites and receives signals emitted from the positioning satellites. Further, the GNSS receiver 34 calculates the distances to the positioning satellites based on the difference between the times of emission and times of reception of the signals and detects the current position of the vehicle 3 based on the distances to the positioning satellites and the positions of the positioning satellites (orbital information). The output of the GNSS receiver 34, that is, the current position of the vehicle 3 detected by the GNSS receiver 34, is sent to the ECU 7.

Note that, "GNSS" (Global Navigation Satellite System) is a general name of the GPS of the U.S., GLONASS of Russia, Galileo of Europe, QZSS of Japan, BeiDou of China, IRNSS of India, and other satellite positioning systems. Therefore, the GNSS receiver 34 includes a GPS receiver.

The map database 35 stores map information. The map information includes position information of the power supply area where the power transmission coils 44 of the power supply apparatus 2 are installed, etc. The ECU 7 acquires map information from the map database 35. Note that, the map database may be provided outside of the vehicle 3 (for example, the server etc.), and the ECU 7 may acquire map information from outside the vehicle 3.

The sensors 36 detect the state of the vehicle 3. For example, the sensors 36 include a vehicle speed sensor for detecting the speed of the vehicle 3, a battery current sensor for detecting the input/output current with respect to the battery 32, etc.

The HMI 37 performs input/output of information between the vehicle 3 and a driver of the vehicle 3. The HMI 37 includes, for example, a display for displaying information, a speaker for emitting sound, an operation button, an operation switch, or a touchscreen with which the driver enter inputs, a microphone for receiving driver speech, etc. The output of the ECU 7 is communicated to the driver via the HMI 37, and input from the driver is transmitted to the ECU 7 via the HMI 37. The HMI 37 is one example of an input device, an output device, or an input/output device.

The communication device 38 is equipment enabling communication between the vehicle 3 and the outside of the vehicle 3. In the present embodiment, the communication device 38 includes a near field wireless communication module. The ECU 7 communicates with the power supply apparatus 2 using the communication device 38.

Figure 4:
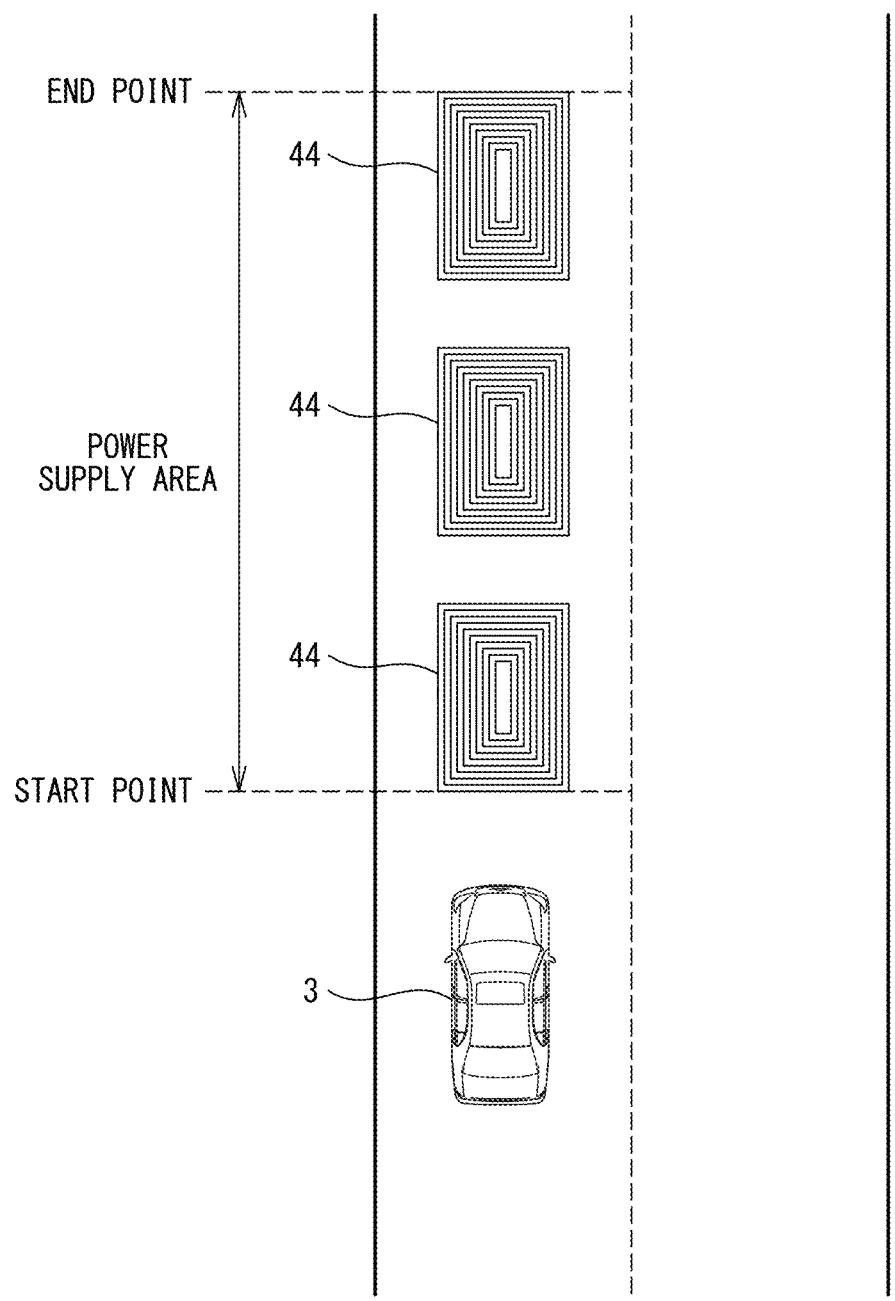
FIG. 4 is a view showing one example of a power supply area in which power transmission coils of the power supply apparatus are installed.

FIG. 4 is a view showing one example of a power supply area where the power transmission coils 44 of the power supply apparatus 2 are installed. In the example in FIG. 4, three power transmission coils 44 are installed on the same lane on a road and spaced apart along the direction of advance of the vehicle 3. The range on the lane over which the power transmission coils 44 are installed corresponds to the power supply area. Note that, the number of power transmission coils 44 installed in the power supply area may be another number (for example, one).

If power is supplied to the vehicle 3 at the power supply area, as shown in FIG. 4, the vehicle 3 runs toward the power supply area on the lane of the power supply area. Further, when the vehicle 3 approaches the power supply area, the ECU 7 of the vehicle 3 uses the communication device 38 to transmit a power supply request signal for requesting power supply to the vehicle 3 from the power supply apparatus 2. When receiving the power supply request signal from the vehicle 3, the controller 6 of the power supply apparatus 2 causes the power transmission apparatus 4 to generate an alternating current magnetic field for power transmission. That is, when receiving the power supply request signal from the vehicle 3, the controller 6 starts non-contact power supply to the vehicle 3 from the power supply apparatus 2.

However, the driver of the vehicle 3 is liable to change lanes from the lane of the power supply area to an adjacent lane if not aware of the presence of the power supply area etc. If changing lanes at the power supply area, the vehicle 3 will deviate in position away from the power transmission coil 44 in the vehicle width direction and the power supply efficiency will drop. Further, the opportunity to supply power to the vehicle 3 will be lost if changing lanes in a manner that avoids passing through the power supply area. Therefore, in the present embodiment, the amount of power supplied to the vehicle 3 kept from falling by prohibiting lane changes that would cause a drop in the amount of power supplied to the vehicle 3.

Figure 5:
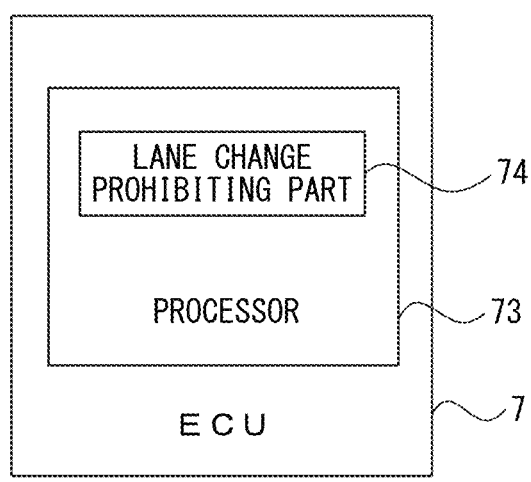
FIG. 5 is a functional block diagram of a processor of the ECU in the first embodiment.

FIG. 5 is a functional block diagram of the processor 73 of the ECU 7 in the first embodiment. In the present embodiment, the processor 73 has a lane change prohibiting part 74. The lane change prohibiting part 74 is a functional module realized by a computer program stored in the memory 72 of the ECU 7 being run by the processor 73 of the ECU 7. Note that the lane change prohibiting part 74 may be realized by a dedicated processing circuit provided at the processor 73 as well.

When the vehicle 3 is running on the lane of the power supply area, the lane change prohibiting part 74 prohibits lane changing by the vehicle 3 in a predetermined range up to the end point of the power supply area. In particular, in the present embodiment, the lane change prohibiting part 74 prohibits lane changing by manual driving of the driver of the vehicle 3 in the predetermined range. Note that in the present embodiment, lane changing by the vehicle 3 is prohibited taking only the running position of the vehicle 3 into consideration. That is, lane changing by the vehicle 3 is prohibited regardless of the traffic in a lane adjacent to the lane of the power supply area. Accordingly, lane changing by the vehicle 3 is prohibited even if there are no other vehicles in a lane adjacent to the lane of the power supply area.

The predetermined range where lane changing is prohibited includes, for example, the range from the start point of the power supply area to the end point of the power supply area. This makes it possible to keep the vehicle 3 from deviating in position away from the power transmission coil 44 due to lane changing in the power supply area and in turn keep the amount of power supplied to the vehicle 3 from dropping.

Further, when the vehicle 3 is located in the area before the power supply area, it is more difficult for the driver of the vehicle 3 to recognize the presence of the power supply area. For this reason, the predetermined range where lane changing is prohibited may include the range before the power supply area in the direction of advance of the vehicle 3. This makes it possible to keep lane changing that would avoid passage through the power supply area from happening and in turn keep the amount of power supplied to the vehicle 3 from dropping. For example, the predetermined range is set to the range from the start point of the power supply area to the end point of the power supply area, the range from a predetermined position before the power supply area to the start point or the end point of the power supply area, etc.

Figure 6:
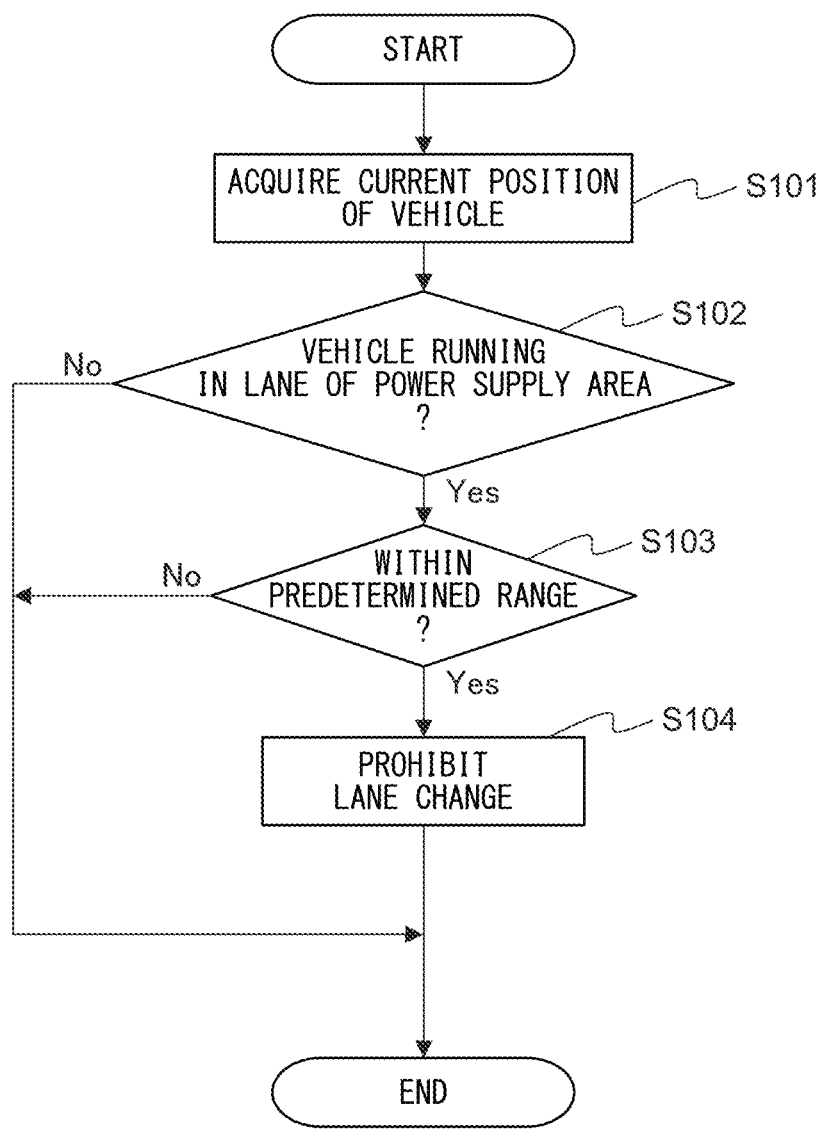
FIG. 6 is a flow chart showing a control routine carried out in the vehicle in the first embodiment.

Below, referring to the flow chart of FIG. 6, the flow of the above-mentioned control will be explained. FIG. 6 is a flow chart showing a control routine carried out in the vehicle 3 in the first embodiment. The present control routine is repeatedly performed by the processor 73 of the ECU 7.

First, at step S101, the lane change prohibiting part 74 acquires the current position of the vehicle 3 based on the output of the GNSS receiver 34.

Next, at step S102, the lane change prohibiting part 74 judges whether the vehicle 3 is running on the lane of the power supply area based on the current position of the vehicle 3 and the position information of the power supply area stored in the map database 35. If it is judged that the vehicle 3 is not running on the lane of the power supply area, for example, if the vehicle 3 is running on a lane adjacent to the lane of the power supply area and where the power transmission coil 44 is not installed, the present control routine ends. On the other hand, if it is judged that the vehicle 3 is running on the lane of the power supply area, the present control routine proceeds to step S103.

At step S103, the lane change prohibiting part 74 judges whether the vehicle 3 is located within the predetermined range up to the end point of the power supply area based on the current position of the vehicle 3 and the position information of the power supply area. If it is judged that the vehicle 3 is not located within the predetermined range, the present control routine ends. On the other hand, if it is judged that the vehicle 3 is located within the predetermined range, the present control routine proceeds to step S104.

At step S104, the lane change prohibiting part 74 prohibits lane changing by the vehicle 3 by manual driving of the driver of the vehicle 3. For example, the lane change prohibiting part 74 prohibits lane changing by the vehicle 3 by notifying the driver of the vehicle 3 through the HMI 37 that lane changing is prohibited. This makes it possible to prompt the driver of the vehicle 3 to drive straight.

Figure 7:
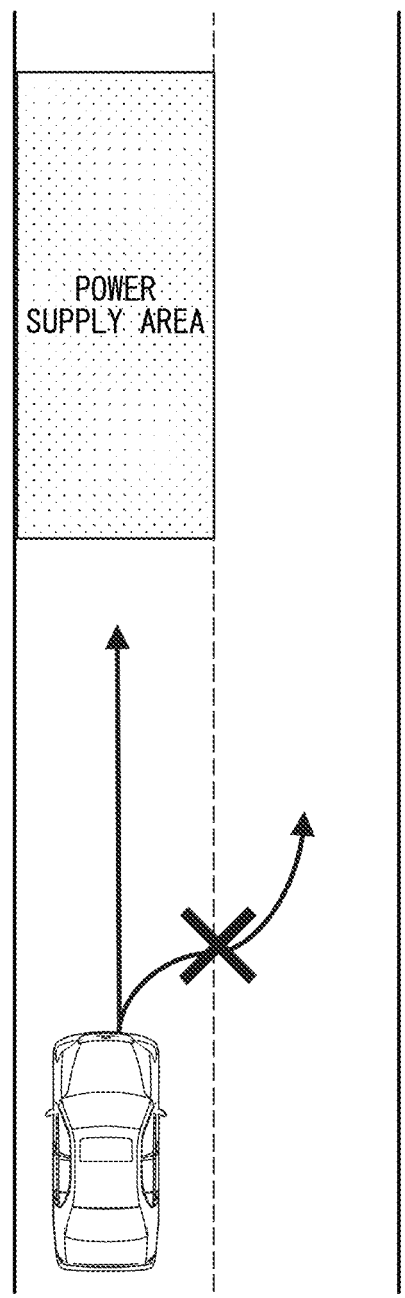
FIG. 7 is a view showing one example of image information output from an HMI to notify that lane change is prohibited.

The information output from the HMI 37 for notifying that lane changing is prohibited includes at least one of text information, voice information, and image information. That is, the lane change prohibiting part 74 notifies the driver of the vehicle 3 through the HMI 27 that lane changing is prohibited in a visual or auditory manner. FIG. 7 is a view showing one example of image information output from the HMI 37 to notify that lane change is prohibited.

Note that at step S104, the lane change prohibiting part 74 may obstruct operation by the driver of the vehicle 3 for lane changing, instead of notifying that lane changing is prohibited or in addition to notifying that lane changing is prohibited. That is, the lane change prohibiting part 74 may prohibit lane changing by the vehicle 3 by obstructing operation by the driver of the vehicle 3 for lane changing. For example, the lane change prohibiting part 74 prohibits lane changing by obstructing operation of the turn signal of the vehicle 3 by the driver of the vehicle 3. In this case, for example, a vibrating unit is built in the turn signal lever of the vehicle 3, and the lane change prohibiting part 74 causes the turn signal lever of the vehicle 3 to vibrate when the turn signal lever is operated. Further, the lane change prohibiting part 74 may produce a warning sound through the HMI 37 when the turn signal lever of the vehicle 3 is operated.

Further, the lane change prohibiting part 74 may prohibit lane changing by obstructing turning of the steering wheel of the vehicle 3 by the driver of the vehicle 3. In this case, for example, a vibrating unit is built in the steering wheel of the vehicle 3, and the lane change prohibiting part 74 causes the steering wheel of the vehicle 3 to vibrate when the steering wheel is operated. Further, the lane change prohibiting part 74 may use the power steering mechanism of the vehicle 3 to increase the force needed to turn the steering wheel. After step S104, the present control routine ends.

Second Embodiment

The configuration and control of the vehicle according to a second embodiment are basically similar to the configuration and control of the vehicle according to the first embodiment except for the points explained below. For this reason, below, the second embodiment of the present disclosure will be explained focusing on parts different from the first embodiment.

As explained above, the lane change prohibiting part 74 notifies the driver of the vehicle 3 through the HMI 37 that lane changing is prohibited when the vehicle 3 is within the predetermined range up to the end point of the power supply area. However, notifications to the driver that lane changing is prohibited are likely to feel bothersome to the driver when the driver has no intention to change lanes.

Therefore, in the second embodiment, the lane change prohibiting part 74 notifies the driver through the HMI 37 that lane changing is prohibited when operation of the turn signal of the vehicle 3 by the driver is detected. This makes it possible to prompt the driver to stop changing lanes when the driver has indicated the intention to change lanes. Accordingly, this makes it possible to reduce the bother that results from lane change prohibition notifications.

Further, normally, when a vehicle 3 approaches a preceding vehicle running in front of the vehicle 3, often the driver of the vehicle 3 will attempt to change lanes to pass the preceding vehicle. For this reason, the lane change prohibiting part 74 may notify the driver through the HMI 37 that lane changing is prohibited when the positional relationship between the preceding vehicle and the vehicle 3 (host vehicle) satisfies a predetermined condition. This makes it possible to prompt the driver to stop changing lanes when it is likely that the driver will make a lane change. Accordingly, this makes it possible to reduce the bother that results from lane change prohibition notifications.

In the second embodiment, the sensors 36 of the vehicle 3 include a surrounding vehicle detection device for detecting surrounding vehicles of the vehicle 3 (host vehicle), and the lane change prohibiting part 74 acquires the positional relationship between the preceding vehicle and the vehicle 3 based on the output of the surrounding vehicle detection device. For example, the surrounding vehicle detection device is constituted by a stereo camera, a laser imaging detection and ranging device (LIDAR), a millimeter wave radar or ultrasonic sensor (sonar), or any combination thereof. Note that the communication device 38 of the vehicle 3 may include a vehicle-to-vehicle communication device, and the lane change prohibiting part 74 may acquire the positional relationship between the preceding vehicle and the vehicle 3 based on vehicle information (current position, speed, etc., of the preceding vehicle) transmitted to the vehicle 3 from the preceding vehicle by vehicle-to-vehicle communication.

Figure 8:
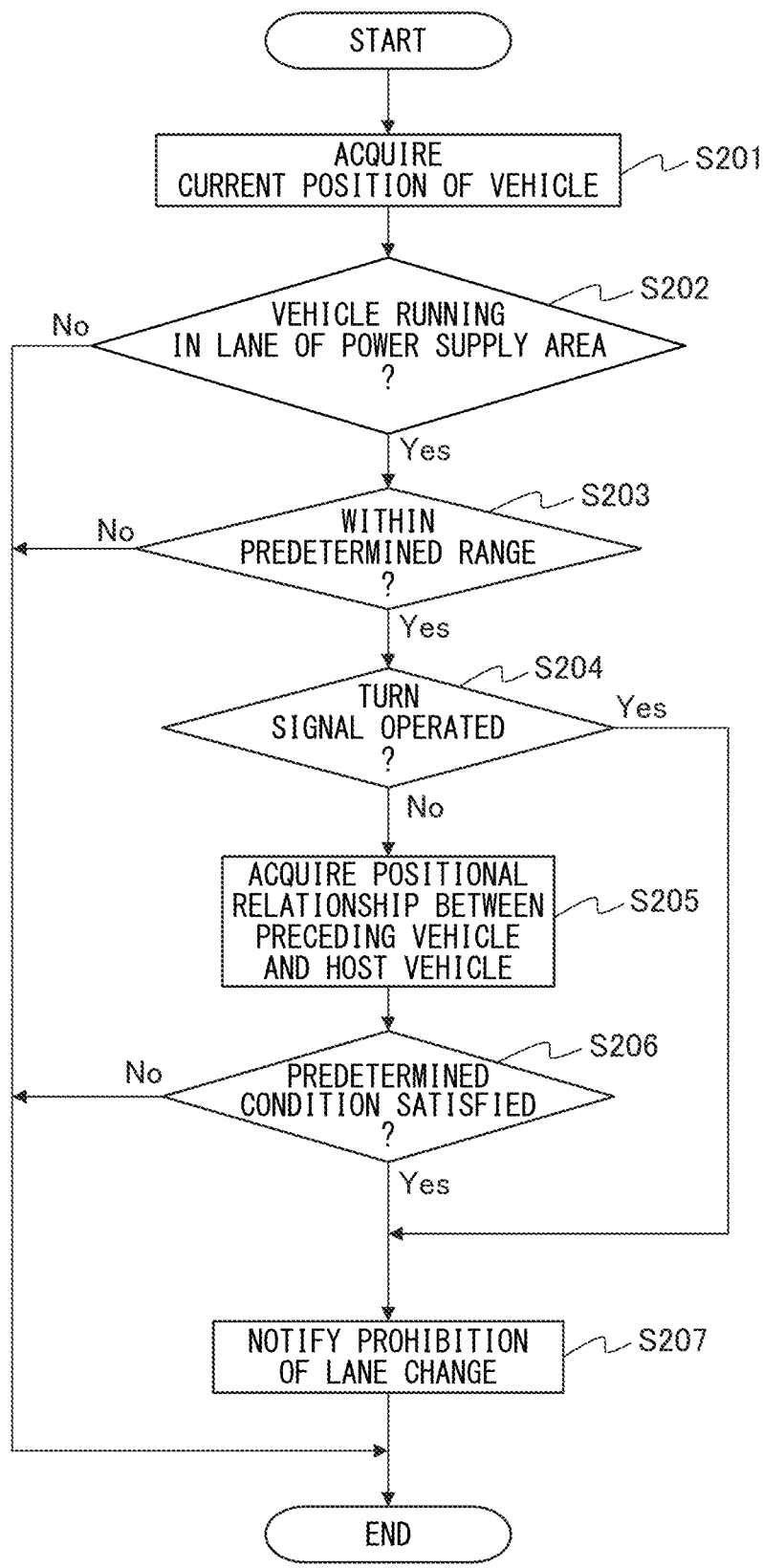
FIG. 8 is a flow chart showing a control routine carried out in a vehicle in a second embodiment.

FIG. 8 is a flow chart showing a control routine carried out in the vehicle 3 in the second embodiment. The present control routine is repeatedly performed by the processor 73 of the ECU 7.

Steps S201 to S203 are performed similarly to steps S101 to S103 of FIG. 6. If it is judged at step S203 that the vehicle 3 is within the predetermined range up to the end point of the power supply area, the present control routine proceeds to step S204.

At step S204, the lane change prohibiting part 74 judges whether the turn signal of the vehicle 3 has been operated by the driver. For example, the lane change prohibiting part 74 judges that the turn signal has been operated by the driver when operation of the turn signal lever of the vehicle 3 is detected. If it is judged at step S204 that the turn signal has not been operated by the driver, the present control routine advances to step S205.

At step S205, the lane change prohibiting part 74 acquires the positional relationship between the preceding vehicle and the vehicle 3. For example, the lane change prohibiting part 74 acquires the distance between the preceding vehicle and the vehicle 3 as the positional relationship between the preceding vehicle and the vehicle 3. The distance between the preceding vehicle and the vehicle 3 is acquired based on the output of the surrounding vehicle detection device or vehicle information transmitted to the vehicle 3 from the preceding vehicle by vehicle-to-vehicle communication (specifically, the current position of the preceding vehicle).

Next, at step S206, the lane change prohibiting part 74 judges whether a predetermined condition relating to the positional relationship between the preceding vehicle and the vehicle 3 is satisfied. The predetermined condition is, for example, that the distance between the preceding vehicle and the vehicle 3 is equal to or less than a predetermined distance. In this case, the predetermined condition is satisfied when the distance between the preceding vehicle and the vehicle 3 is equal to or less than the predetermined distance and is not satisfied when the distance between the preceding vehicle and the vehicle 3 is longer than the predetermined distance.

Note that the lane change prohibiting part 74 acquires the time to collision (TTC) of the vehicle 3 with respect to the preceding vehicle as the positional relationship between the preceding vehicle and the vehicle 3, and the predetermined condition may be that the time to collision is equal to or less than a predetermined time. The time to collision of the vehicle 3 with respect to the preceding vehicle is calculated by dividing the distance between the preceding vehicle and the vehicle 3 by the relative speed between the vehicle 3 and the preceding vehicle (the speed of the vehicle 3 minus the speed of the preceding vehicle). At this time, the speed of the vehicle 3 is acquired based on the outputs of the sensors 36 (specifically, the vehicle speed sensor) of the vehicle 3, and the speed of the preceding vehicle is acquired based on the output of the surrounding vehicle detection device or vehicle information (specifically, the speed of the preceding vehicle) transmitted to the vehicle 3 from the preceding vehicle by vehicle-to-vehicle communication.

Further, the lane change prohibiting part 74 acquires the time for the vehicle 3 to reach the current position of the preceding vehicle (time headway (THW)) as the positional relationship between the preceding vehicle and the vehicle 3, and the predetermined condition may be that this time is equal to or less than a predetermined time. The time for the vehicle 3 to reach the current position of the preceding vehicle is calculated by dividing the distance between the preceding vehicle and the vehicle 3 by the speed of the vehicle 3.

If it is judged at step S206 that the predetermined condition is not satisfied, the present control routine ends. On the other hand, if it is judged at step S204 that the turn signal is operated by the driver or it is judged at step S206 that the predetermined condition is satisfied, the present control routine proceeds to step S207. At step S207, in the same way as step S104 of FIG. 6, the lane change prohibiting part 74 prohibits lane changing by the vehicle 3 by notifying the driver of the vehicle 3 through the HMI 37 that lane changing is prohibited. After step S207, the present control routine ends.

Note that step S204 or steps S205 and S206 may be omitted. If steps S205 and S206 are omitted, the present control routine ends when the judgment at step S204 is denied.

Further, in the second embodiment as well, like in the first embodiment, the lane change prohibiting part 74 may prohibit lane changing by the vehicle 3 by obstructing operation by the driver for lane changing when the vehicle 3 is located within the predetermined range up to the end point of the power supply area.

Third Embodiment

The configuration and control of the vehicle according to a third embodiment are basically similar to the configuration and control of the vehicle according to the first embodiment except for the points explained below. For this reason, below, the third embodiment of the present disclosure will be explained focusing on parts different from the first embodiment.

The power to be consumed by the vehicle 3 when the vehicle 3 runs is supplied from the battery 32 of the vehicle 3. For this reason, when the SOC of the battery 32 is high, it is not necessarily needed to supply power to the vehicle 3 at the power supply area. Therefore, in the third embodiment, it is judged whether lane changing by the vehicle 3 is allowed based on the SOC of the battery 32.

Figure 9:
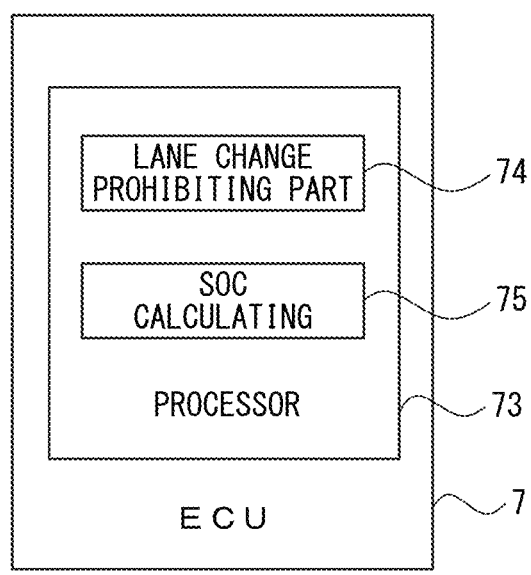
FIG. 9 is a functional block diagram of a processor of an ECU in a third embodiment.

FIG. 9 is a functional block diagram of the processor 73 of the ECU 7 in the third embodiment. In the present embodiment, the processor 73 has in addition to the lane change prohibiting part 74 a SOC calculating part 75. The lane change prohibiting part 74 and the SOC calculating part 75 are functional modules realized by a computer program stored in the memory 72 of the ECU 7 being run by the processor 73 of the ECU 7. Note that the lane change prohibiting part 74 and the SOC calculating part 75 may be realized by dedicated processing circuits provided at the processor 73.

The SOC calculating part 75 calculates the SOC of the battery 32 of the vehicle 3. Further, the lane change prohibiting part 74 prohibits lane changing by the vehicle 3 in the predetermined range when the SOC of the battery 32 is less than a predetermined value and permits lane changing by the vehicle 3 in the predetermined range when the SOC of the battery 32 is equal to or greater than the predetermined value. This makes it possible to keep lane changing by the vehicle 3 from being prohibited when there is no need for the vehicle 3 to pass through the power supply area.

Figure 10:
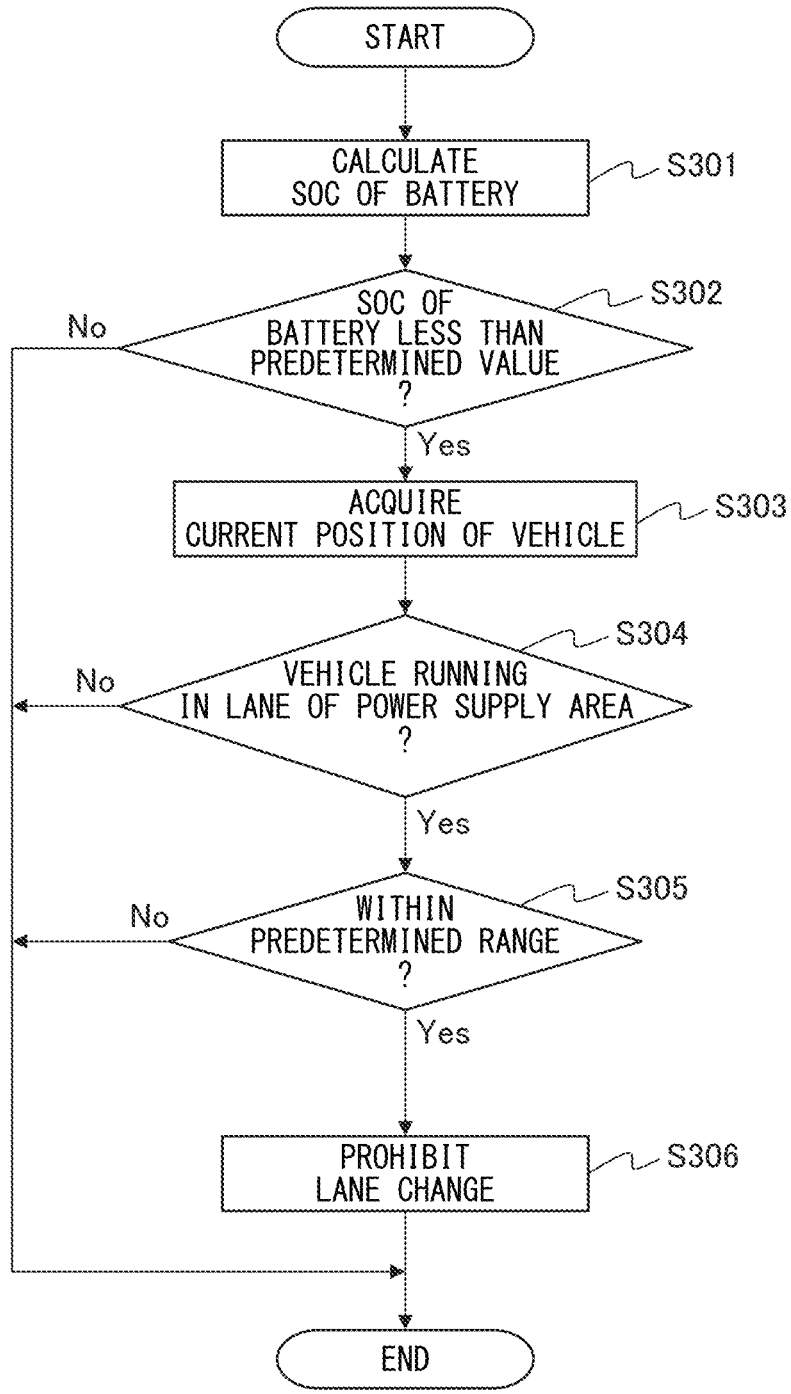
FIG. 10 is a flow chart showing a control routine carried out in a vehicle in the third embodiment.

FIG. 10 is a flow chart showing a control routine carried out in the vehicle 3 in the third embodiment. The present control routine is repeatedly performed by the processor 73 of the ECU 7.

First, at step S301, the SOC calculating part 75 calculates the SOC of the battery 32 of the vehicle 3 based on the outputs of the sensors 36 of the vehicle 3. For example, the SOC calculating part 75 calculates the SOC of the battery 32 by cumulatively adding the input/output current with respect to the battery 32 detected by the sensors 36 (specifically, the battery current sensor).

Next, at step S302, the lane change prohibiting part 74 judges whether the SOC of the battery 32 is less than a predetermined value. The predetermined value is set to a value sufficient for sustaining travel by the vehicle 3 (for example, 50 to 80%). Note that when the destination of the vehicle 3 is input by the driver into the HMI 37, the predetermined value may be changed according to the distance of the current position of the vehicle 3 to the destination of the vehicle 3. In this case, the longer the distance, the higher the predetermined value.

If it is judged at step S302 that the SOC of the battery 32 is equal to or greater than the predetermined value, the present control routine ends. On the other hand, if it is judged at step S302 that the SOC of the battery 32 is less than the predetermined value, the present control routine proceeds to step S303. Steps S303 to step S306 are performed similarly to steps S101 to S104 of FIG. 6, and when the judgments at steps S304 and S305 are affirmed, lane changing by the vehicle 3 is prohibited at step S306.

Fourth Embodiment

The configuration and control of the vehicle according to a fourth embodiment are basically similar to the configuration and control of the vehicle according to the first embodiment except for the points explained below. For this reason, below, the fourth embodiment of the present disclosure will be explained focusing on parts different from the first embodiment.

In order to reduce the power or amount of fuel necessary for the vehicle to run, it is effective to reduce the air resistance during running. "Platooning" by a plurality of vehicles is known as a method for reducing air resistance during running. While platooning is carried out, sometimes the line is reorganized because of various factors. For example, if an incentive is given to a lead vehicle which cannot obtain the effect of air resistance reduction, it is conceivable that the driver of a vehicle at the rear of the line would desire to move to the head of the line. On the other hand, when the SOC of the battery of the lead vehicle drops, it is conceivable that the driver of the lead vehicle would desire to move to the rear of the line.

However, if the vehicle 3 is platooning, a lane change to reorganize the line is liable to reduce the amount of power supplied to the vehicle 3 in the power supply area. For this reason, in the fourth embodiment, the lane change prohibiting part 74 prohibits lane changing by manual driving of the driver by notifying the driver through the HMI 37 that reorganization of the line is prohibited. This makes it possible to minimize the reduction in the amount of power supplied to the vehicle 3 accompanying reorganization of the line.

In the fourth embodiment, like in the second embodiment, the sensors 36 of the vehicle 3 include a surrounding vehicle detection device, and the lane change prohibiting part 74 judges whether the vehicle 3 is platooning based on the output of the surrounding vehicle detection device. Note that the communication device 38 of the vehicle 3 may include a vehicle-to-vehicle communication device, and the lane change prohibiting part 74 may judge whether the vehicle 3 is platooning based on vehicle information (current position, speed, etc. of surrounding vehicle) transmitted to the vehicle 3 from a surrounding vehicle by vehicle-to-vehicle communication.

Figure 11:
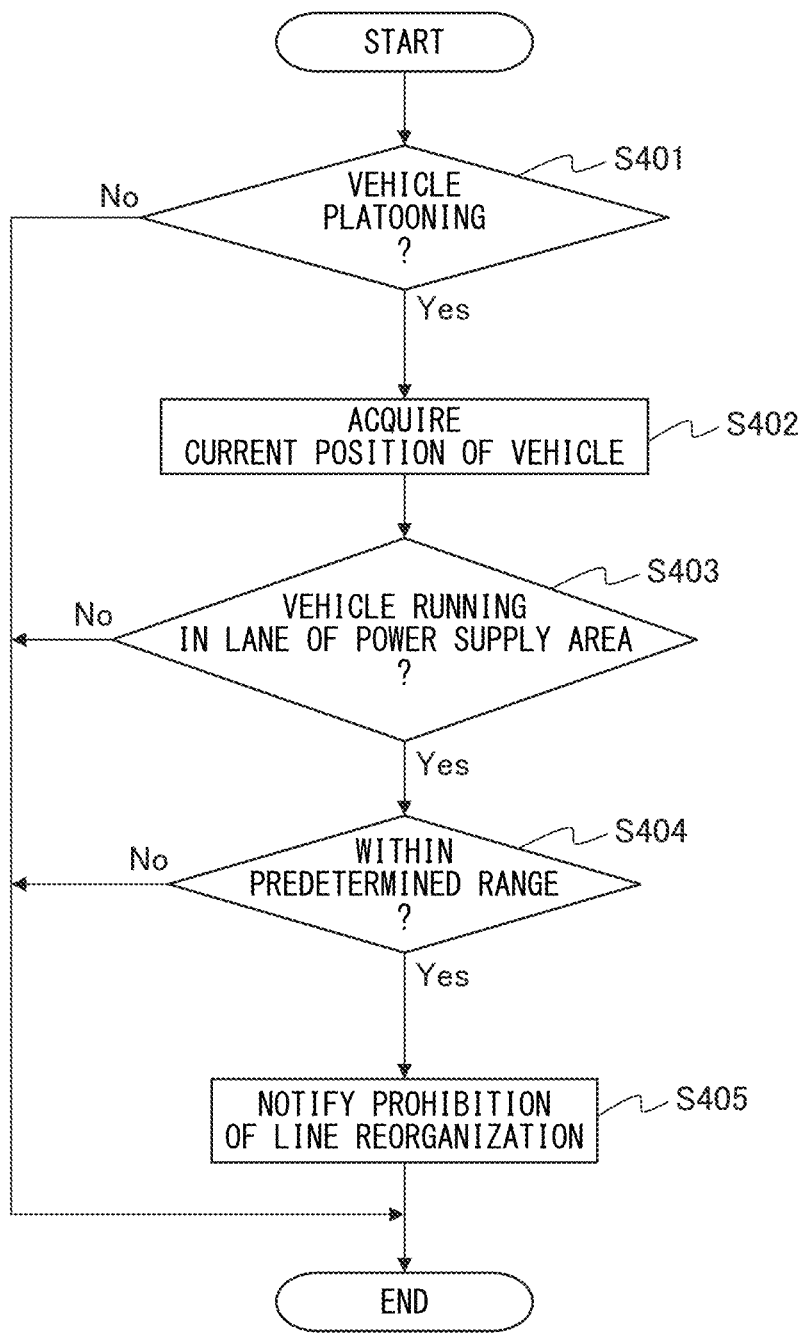
FIG. 11 is a flow chart showing a control routine carried out in a vehicle in a fourth embodiment.

FIG. 11 is a flow chart showing a control routine carried out in the vehicle 3 in the fourth embodiment. The present control routine is repeatedly performed by the processor 73 of the ECU 7.

First, at step S401, the lane change prohibiting part 74 judges whether the vehicle 3 is platooning. For example, the lane change prohibiting part 74 judges that the vehicle 3 is platooning if the distance between the vehicle 3 and a preceding vehicle running forward of the vehicle 3 or a following vehicle running rearward of the vehicle 3 is maintained within a predetermined distance for equal to or greater than a predetermined time. The distance between vehicle 3 and the preceding vehicle or the following vehicle is acquired based on the output of the surrounding vehicle detection device or vehicle information (specifically, the current position of the preceding vehicle or the following vehicle) transmitted to the vehicle 3 from the preceding vehicle or the following vehicle by vehicle-to-vehicle communication.

Note that the lane change prohibiting part 74 may judge that the vehicle 3 is platooning if the relative speed between the vehicle 3 and the preceding vehicle or following vehicle is maintained within a predetermined value for a predetermined time or greater. The relative speed between the vehicle 3 and the preceding vehicle or the following vehicle is acquired based on the output of the sensors 36 of the vehicle 3 (specifically the vehicle speed sensor) and the output of the surrounding vehicle detection device or the vehicle information (specifically the speed of the preceding vehicle or the following vehicle) transmitted to the vehicle 3 from the preceding vehicle or the following vehicle by vehicle-to-vehicle communication.

Further, for example, if start and end of platooning are notified through vehicle-to-vehicle communication from a vehicle desiring platooning to the surrounding vehicles, it is judged that the vehicle 3 is platooning from when the vehicle 3 transmits the start notification to when the vehicle 3 transmits the end notification or from when the vehicle 3 receives the start notification to when the vehicle 3 receives the end notification.

If it is judged at step S401 that the vehicle 3 is not platooning, the present control routine ends. On the other hand, if it is judged at step S401 that the vehicle 3 is platooning, the present control routine proceeds to step S402. Steps S402 to S404 are performed similarly to steps S101 to S103 of FIG. 6.

If it is judged at step S404 that the vehicle 3 is located within the predetermined range up to the end point of the power supply area, the present control routine proceeds to step S405. At step S405, the lane change prohibiting part 74 notifies the driver of the vehicle 3 through the HMI 37 that line reorganization is prohibited.

The information output from the HMI 37 as a notification that line reorganization is prohibited includes at least one of text information, voice information, and image information. That is, the lane change prohibiting part 74 notifies the driver of the vehicle 3 that line reorganization is prohibited through the HMI 27 in a visual or auditory manner. FIG. 12 is a view showing one example of text information output from the HMI 37 to notify that line reorganization is prohibited. After step S405, the present control routine ends.

Note that steps S402 to S404 may be performed in a surrounding vehicle forming the line with the vehicle 3 (for example, the lead vehicle of the line). In this case, when the judgments at step S403 and S404 are affirmed, a signal indicating that line reorganization is prohibited is transmitted from the surrounding vehicle to the vehicle 3, and the lane change prohibiting part 74 of the vehicle 3 notifies the driver of the vehicle 3 through the HMI 37 that line reorganization is prohibited.

Fifth Embodiment

The configuration and control of the vehicle according to a fifth embodiment are basically similar to the configuration and control of the vehicle according to the fourth embodiment except for the points explained below. For this reason, below, the fifth embodiment of the present disclosure will be explained focusing on parts different from the fourth embodiment.

As explained above, the lane change prohibiting part 74 notifies the driver of the vehicle 3 through the HMI 37 that line reorganization is prohibited when the vehicle 3 is within the predetermined range up to the end point of the power supply area. However, the notification to the driver that line reorganization is prohibited is likely to feel bothersome to the driver when the driver has no intention to reorganize the line.

Therefore, in the fifth embodiment, the lane change prohibiting part 74 notifies the driver of the vehicle 3 through the HMI 37 that line reorganization is prohibited when the driver has requested line reorganization. This makes it possible to prompt the driver to stop line reorganization when the driver has indicated the intention to reorganize the line. Accordingly, this makes it possible to mitigate the bother that results from the notification to stop line reorganization. Note that line reorganization is approved if line reorganization is requested when the vehicle 3 is outside of the predetermined range, and it is notified to surrounding vehicles forming the line with the vehicle 3 by vehicle-to-vehicle communication that the vehicle 3 desires reorganization.

Figure 13:
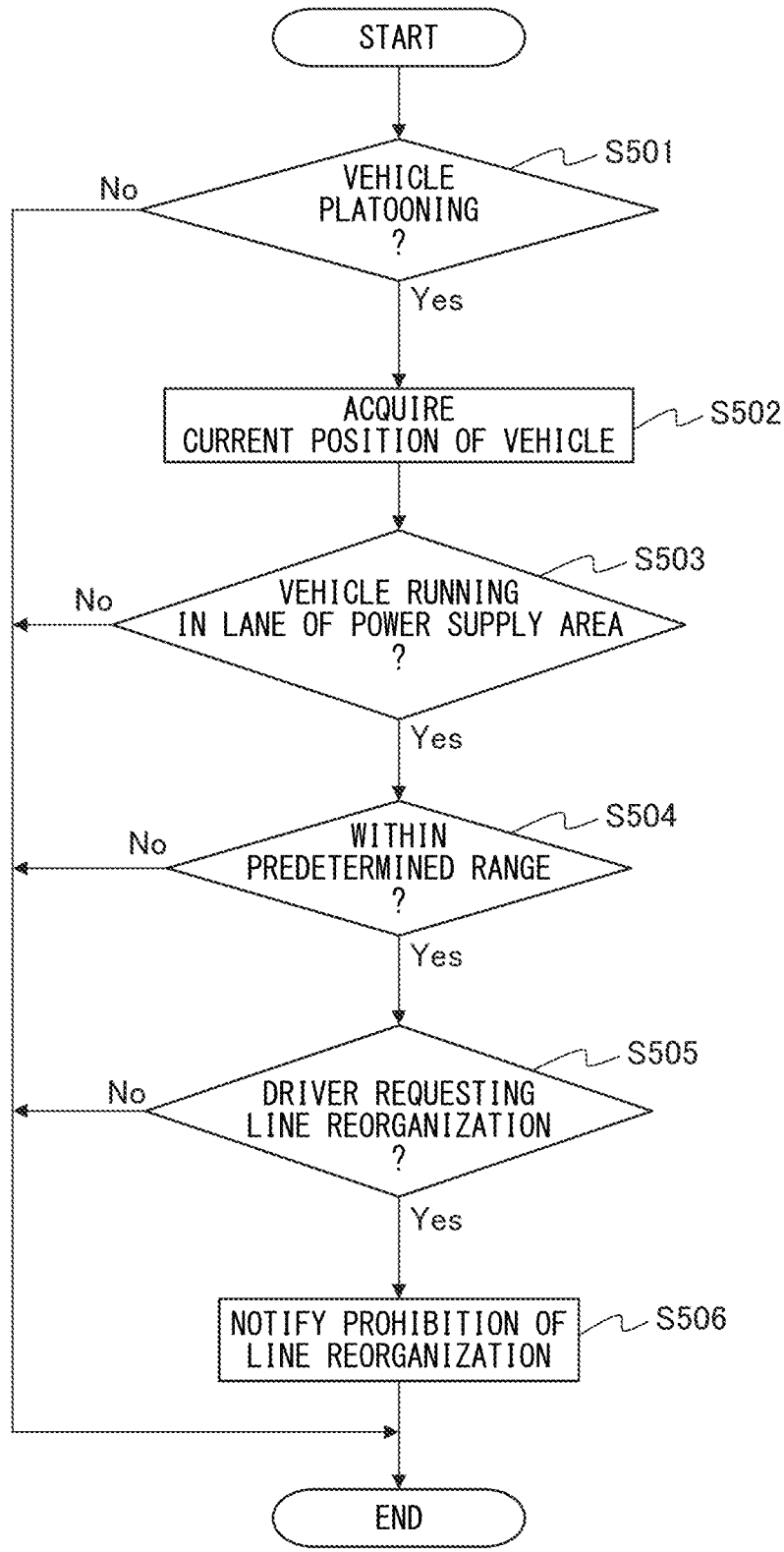
FIG. 13 is a flow chart showing a control routine carried out in a vehicle in a fifth embodiment.

FIG. 13 is a flow chart showing a control routine carried out in the vehicle 3 in the fifth embodiment. The present control routine is repeatedly performed by the processor 73 of the ECU 7.

Steps S501 to S504 are performed similarly to steps S401 to S404 of FIG. 11. If it is judged at step S504 that the vehicle 3 is located within the predetermined range up to the end point of the power supply area, the present control routine proceeds to step S505.

At step S505, the lane change prohibiting part 74 judges whether the driver of the vehicle 3 has requested line reorganization. In the present embodiment, the driver requests line reorganization through the HMI 37, and the lane change prohibiting part 74 judges whether the driver has requested line reorganization based on information input by the driver to the HMI 37. For example, the lane change prohibiting part 74 judges that the driver has requested line reorganization when the driver has selected a screen relating to platooning on the HMI 37. Further, the lane change prohibiting part 74 may judge that the driver has requested line reorganization when the driver has desired to move to the head or rear of the line by button selection and the like on the HMI 37.

If it is judged at step S505 that the driver has not requested line reorganization, the present control routine ends. On the other hand, if it is judged at step S505 that the driver has requested line reorganization, the present control routine proceeds to step S506. At step S506, in the same way as step S405 of FIG. 11, the lane change prohibiting part 74 notifies the driver of the vehicle 3 through the HMI 37 that line reorganization is prohibited. After step S506, the present control routine ends.

Note that steps S502 to S504 may be performed in a surrounding vehicle forming the line with the vehicle 3 (for example, the lead vehicle of the line). In this case, when the judgments at step S503 and S504 are affirmed, a signal indicating that line reorganization is prohibited is transmitted from the surrounding vehicle to the vehicle 3, and when the judgment at step S505 at the vehicle 3 is affirmed, the lane change prohibiting part 74 of the vehicle 3 notifies the driver of the vehicle 3 through the HMI 37 that line reorganization is prohibited.

Sixth Embodiment

The configuration and control of the vehicle according to a sixth embodiment are basically similar to the configuration and control of the vehicle according to the first embodiment except for the points explained below. For this reason, below, the sixth embodiment of the present disclosure will be explained focusing on parts different from the first embodiment.

Figure 14:
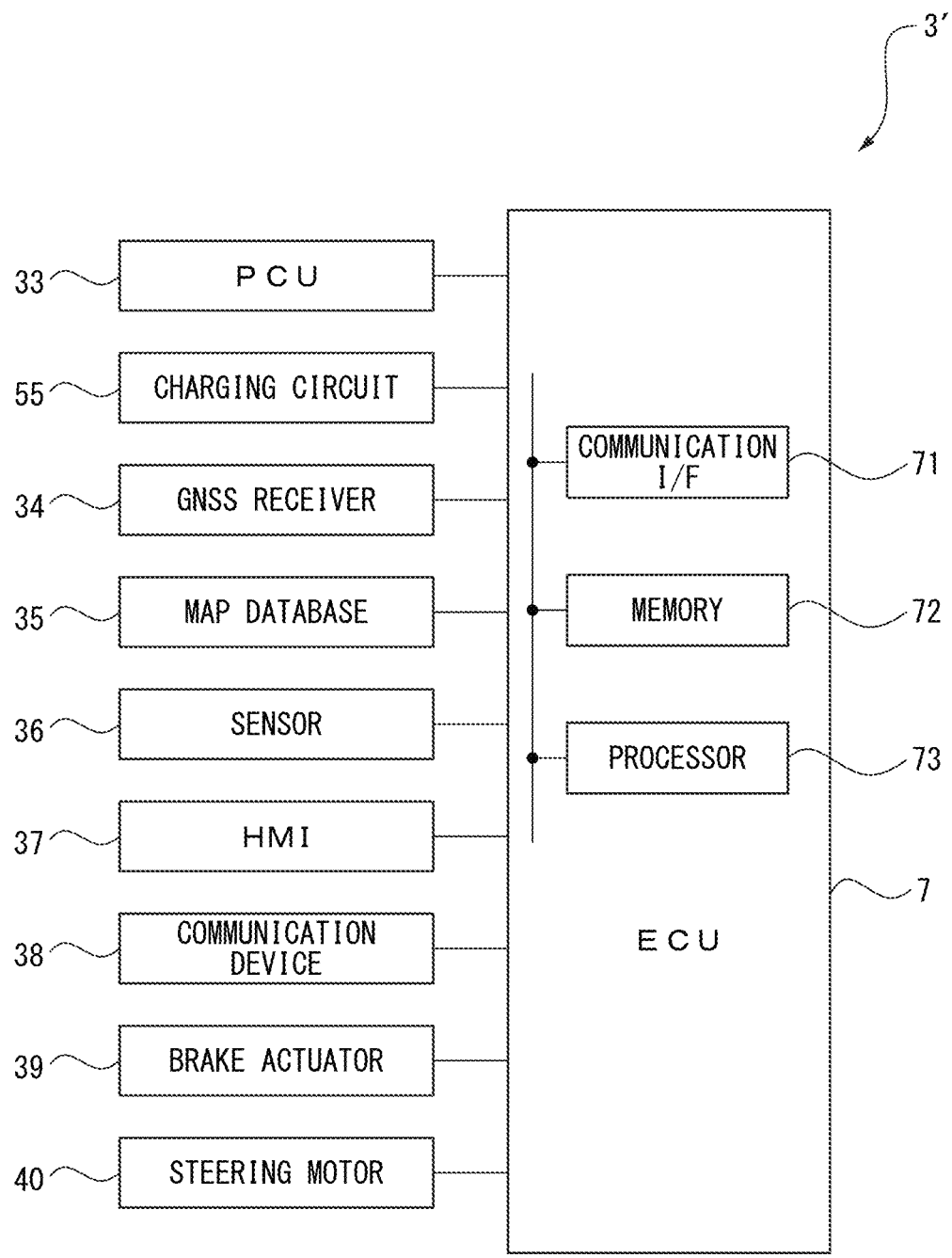
FIG. 14 is a schematic view of a configuration of an ECU of a vehicle according to a sixth embodiment and equipment connected to the ECU.

FIG. 14 is a schematic view of a configuration of the ECU 7 of the vehicle 3' according to the sixth embodiment and equipment connected to the ECU 7. In the sixth embodiment, the vehicle 3' is further provided with a brake actuator 39 and a steering motor 40. The brake actuator 39 actuates brakes provided in the vehicle 3'. The steering motor 40 rotates the steering wheel provided in the vehicle 3'. The brake actuator 39 and the steering motor 40 are electrically connected to the ECU 7, and the ECU 7 controls these.

In the sixth embodiment, the vehicle 3' is an automated driving vehicle for which all of acceleration, steering, and deceleration (braking) are controlled automatically. For example, the motor 31 is controlled via the PCU 33 to control acceleration of the vehicle 3'. Further, the brake actuator 39 is used to control deceleration (braking) of the vehicle 3', and the steering motor 40 is used to control steering of the vehicle 3'.

Accordingly, in the vehicle 3', lane changing by automated driving is performed. For example, lane changing for making a passing maneuver is automatically performed when a predetermined passing condition is satisfied. However, if lane changing by automated driving is performed in the vicinity of a power supply area, the amount of power supplied to the vehicle 3' in the power supply area is liable to drop. For this reason, in the sixth embodiment, when the vehicle 3' is running in the lane of the power supply area, the lane change prohibiting part 74 prohibits lane changing of the vehicle 3' by automated driving in the predetermined range up to the end point of the power supply area. This makes it possible to minimize the reduction in the amount of power supplied to a vehicle 3' caused by lane changing by automated driving.

Figure 15:
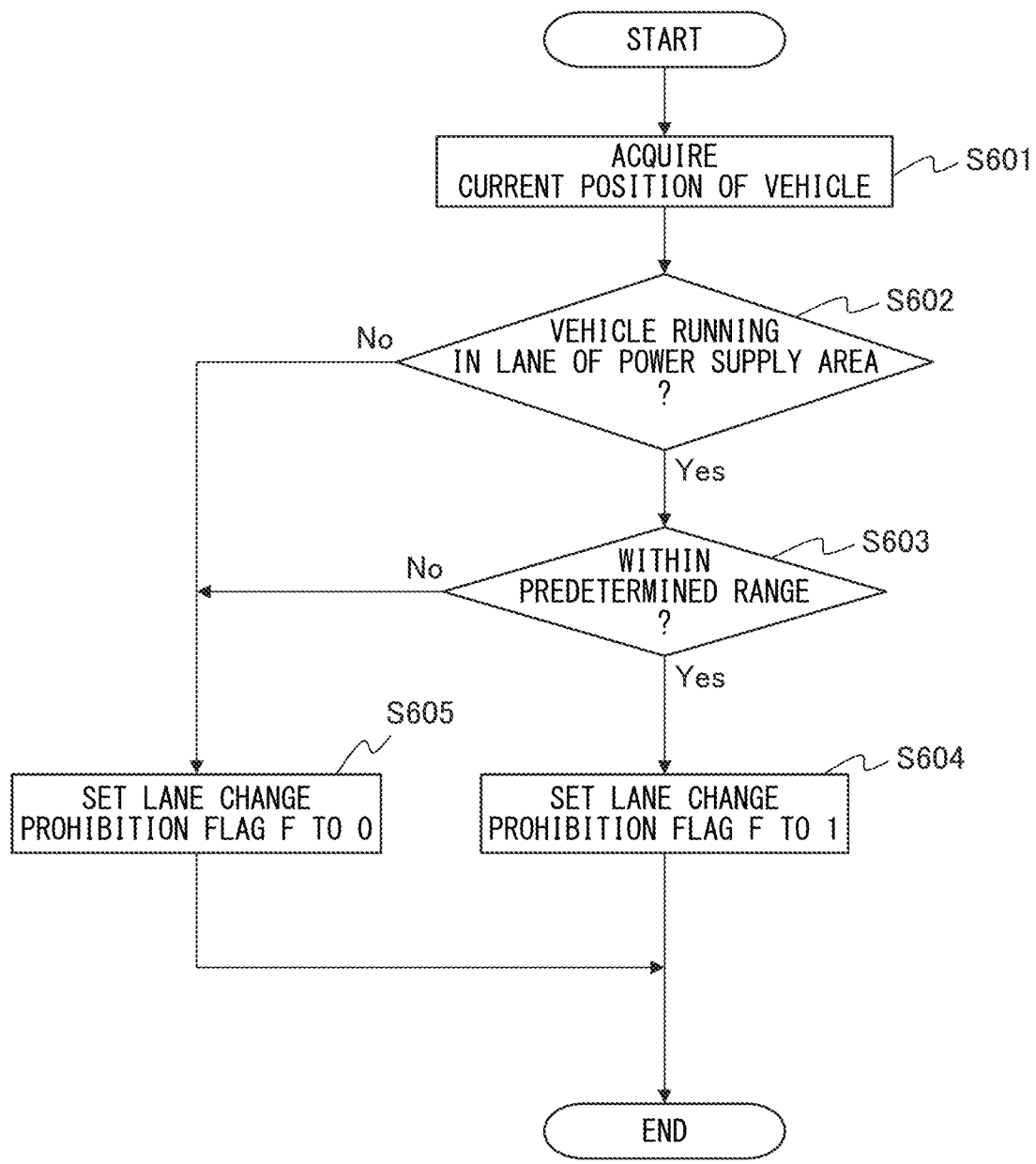
FIG. 15 is a flow chart showing a control routine carried out in the vehicle in the sixth embodiment.

FIG. 15 is a flow chart showing a control routine carried out in the vehicle 3' in the sixth embodiment. The present control routine is repeatedly performed by the processor 73 of the ECU 7.

First, at step S601, in the same way as step S101 of FIG. 6, the lane change prohibiting part 74 acquires the current position of the vehicle 3'.

Next, at step S602, in the same way as step S102 of FIG. 6, the lane change prohibiting part 74 judges whether the vehicle 3' is running in the lane of the power supply area. If it is judged at step S602 that the vehicle 3' is running in the lane of the power supply area, the present control routine proceeds to step S603.

At step S603, in the same way as step S103 of FIG. 6, the lane change prohibiting part 74 judges whether the vehicle 3' is located within the predetermined range up to the end point of the power supply area. If it is judged that the vehicle 3' is within the predetermined range, the present control routine proceeds to step S604.

At step S604, the lane change prohibiting part 74 sets a lane change prohibition flag F to 1 to prohibit lane changing by automated driving. After step S604, the present control routine ends.

On the other hand, if it is judged at step S602 that the vehicle 3' is not running on the lane of the power supply area or it is judged at step S603 that the vehicle 3' is not located within the predetermined range, the present control routine proceeds to step S605. At step S605, the lane change prohibiting part 74 sets the lane change prohibition flag F to zero to permit lane changing by automated driving. After step S605, the present control routine ends.

If the lane changing prohibition flag F is set to 0, lane changing by automated driving is performed when a predetermined condition is satisfied, and if the lane changing prohibition flag F is set to 1, lane changing by automated driving is not performed even if the predetermined condition is satisfied. The predetermined condition is, for example, a predetermined passing condition, a predetermined reorganization condition when the vehicle 3' is platooning, etc.

Accordingly, the lane change prohibiting part 74 permits lane changing for a passing maneuver when the predetermined passing condition is satisfied at a position outside the predetermined range and prohibits lane changing for a passing maneuver when the passing condition is satisfied in the predetermined range. Further, if the vehicle 3' is platooning, the lane change prohibiting part 74 permits lane changing for line reorganization when the predetermined reorganization condition is satisfied at a position outside the predetermined range and prohibits lane changing for line reorganization when the reorganization condition is satisfied in the predetermined range.

Seventh Embodiment

The configuration and control of the vehicle according to a seventh embodiment are basically similar to the configuration and control of the vehicle according to the first embodiment except for the points explained below. For this reason, below, the seventh embodiment of the present disclosure will be explained focusing on parts different from the first embodiment.

Figure 16:
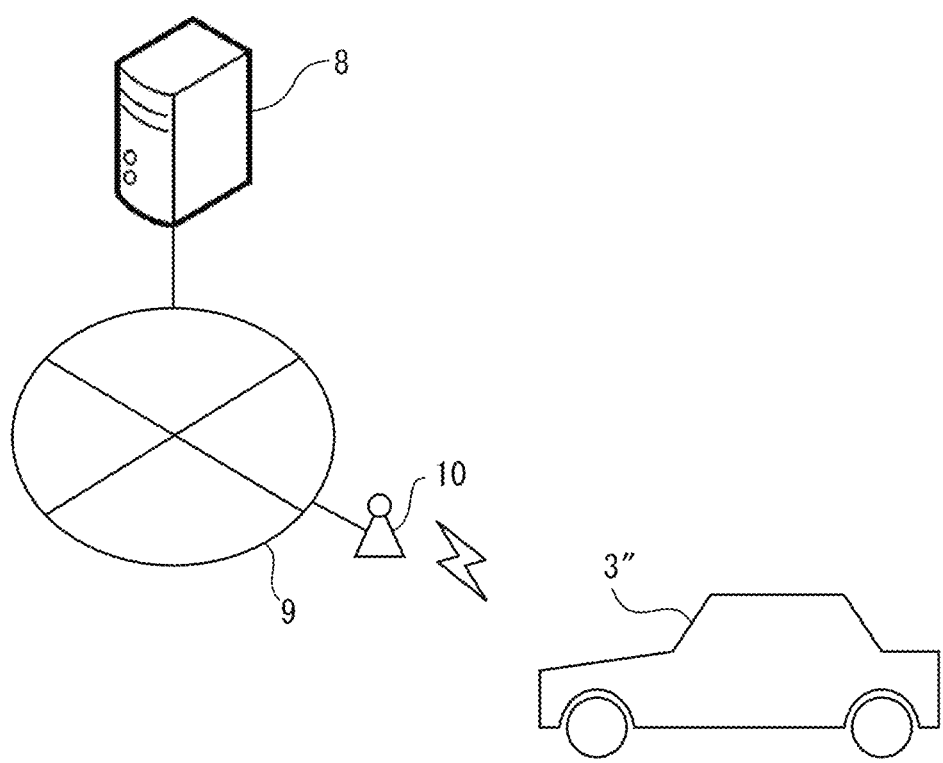
FIG. 16 is a schematic view of a vehicle according to a seventh embodiment.

FIG. 16 is a view schematically showing the vehicle 3" according to the seventh embodiment. In the seventh embodiment, the communication device 38 of the vehicle 3" includes a data communication module (DCM) for connecting the vehicle 3" to a communication network 9 like the Internet. The vehicle 3" uses the communication device 38 to access a wireless base station 10 and communicates with a server 8 outside of the vehicle 3" through the wireless base station 10 and the communication network 9.

Figure 17:
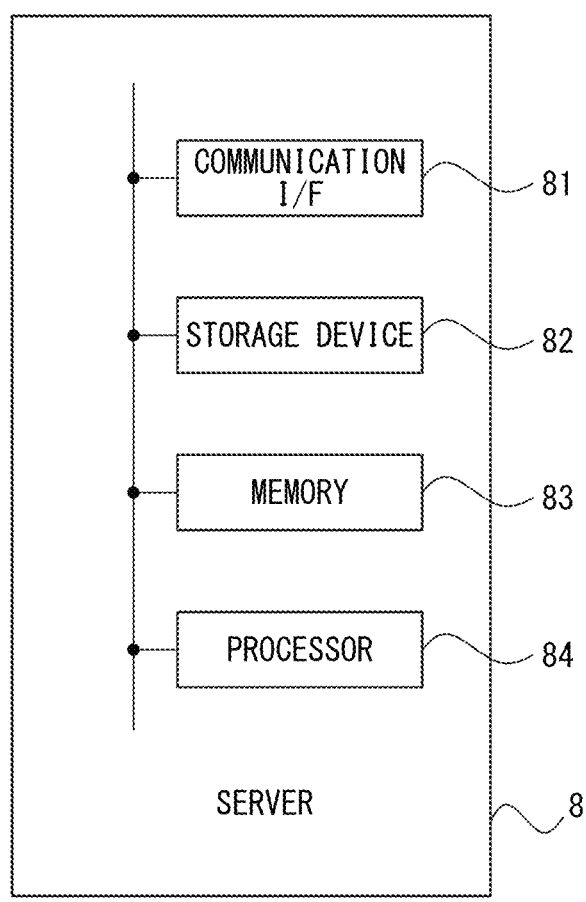
FIG. 17 is a view schematically showing a configuration of a server.

FIG. 17 is a view schematically showing the configuration of the server 8. The server 8 is provided with a communication interface 81, a storage device 82, a memory 83, and a processor 84. The communication interface 81, the storage device 82, and the memory 83 are connected to the processor 84 via signal wires. Note that, the server 8 may be further provided with an input device such as a keyboard and a mouse, an output device such as a display, etc. Further, the server 8 may be constituted by multiple computers.

The communication interface 81 has an interface circuit for connecting the server 8 to the communication network 9. The server 8 communicates with the vehicle 3" through the communication network 9 and the wireless base station 10.

The storage device 82 has, for example, a hard disk drive (HDD), a solid state drive (SSD), or an optical recording medium and an access device of the same. The storage device 82 stores various data, for example, stores vehicle information, map information including position information of the power supply area, etc.

The memory 83 has a non-volatile semiconductor memory (for example, RAM). The memory 83 temporarily stores various data used, for example, when various processes are being run by the processor 84.

The processor 84 has one or more CPUs and peripheral circuits and performs various processes. Note that, the processor 84 may further have other processing circuits such as a logic unit, an arithmetic unit, or a graphic processing unit.

In the seventh embodiment, at the server 8 it is judged whether lane changing by the vehicle 3" is allowed, and the lane change prohibiting part 74 of the vehicle 3" prohibits lane changing by the vehicle 3" based on an instruction from the server 8. As a result, even if the vehicle 3" does not have position information of power supply areas, the server 8 can judge whether lane changing by the vehicle 3" is allowed. Further, even if a power supply area is added or removed, by updating the position information of the power supply areas stored in the server 8, it is possible to judge whether lane changing by the vehicle 3" is allowed based on the latest position information of the power supply areas.

Figure 18:
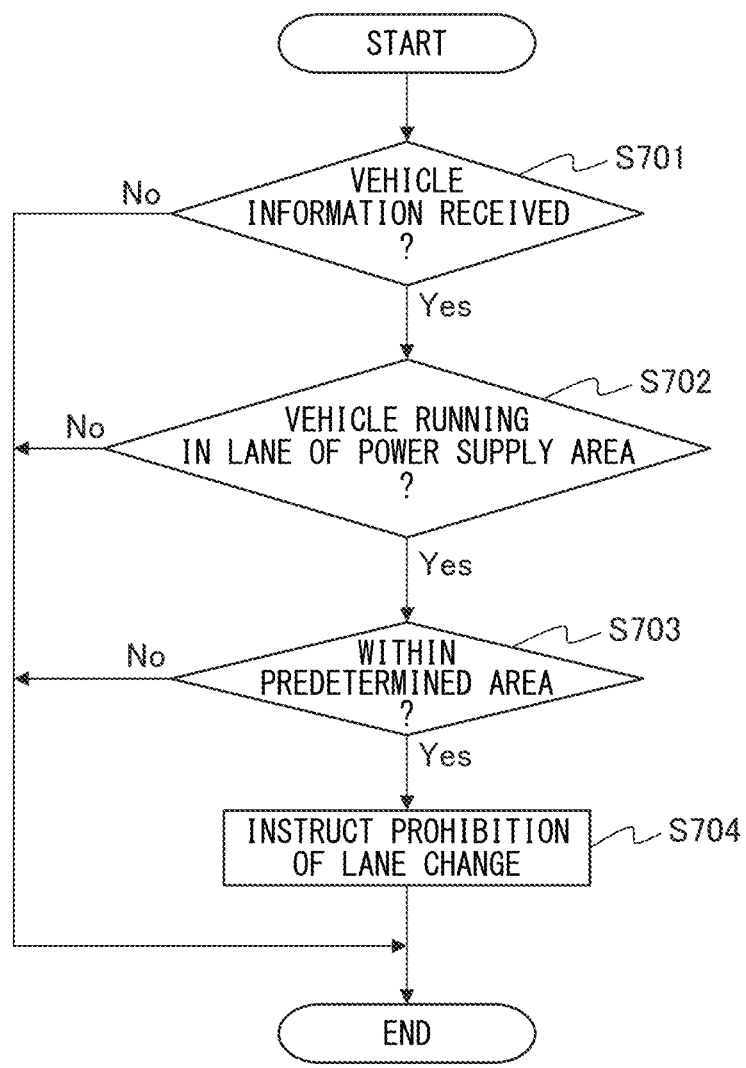
FIG. 18 is a flow chart showing a control routine carried out in the server in the seventh embodiment.

FIG. 18 is a flow chart showing a control routine carried out in the server 8 in the seventh embodiment. The present control routine is repeatedly performed by the processor 84 of the server 8.

First, at step S701, the processor 84 judges whether vehicle information is received from the vehicle 3". The vehicle 3" periodically transmits vehicle information to the server 8, and the vehicle information includes identification information (for example, identification number) of the vehicle 3", the current position of the vehicle 3", the speed of the vehicle 3", etc. If it is judged at step S701 that vehicle information is not received from the vehicle 3", the present control routine ends. On the other hand, if it judged at step S701 that vehicle information is received from the vehicle 3", the present control routine proceeds to step S702.

Next, at step S702, the processor 84 judges whether the vehicle 3" is running in the lane of a power supply area based on the vehicle information (specifically the current position of the vehicle 3") transmitted from the vehicle 3" and map information stored in the storage device 82 of the server 8. If it is judged that the vehicle 3" is not running in the lane of the power supply area, the present control routine ends. On the other hand, it is judged that the vehicle 3" is running in the lane of the power supply area, the present control routine proceeds to step S703.

At step S703, the processor 84 judges whether the vehicle 3" is located within the predetermined range up to the end point of the power supply area based on the vehicle information (specifically the current position of the vehicle 3") transmitted from the vehicle 3" and the map information stored in the storage device 82 of the server 8. If it is judged that the vehicle 3" is not located within the predetermined range, the present control routine ends. On the other hand, if it is judged that the vehicle 3" is located within the predetermined range, the present control routine proceeds to step S704.

At step S704, the processor 84 instructs the vehicle 3" to prohibit lane changing. Specifically, the processor 84 transmits a signal instructing prohibition of lane changing to the vehicle 3" through the communication network 9 and the wireless base station 10. After step S704, the present control routine ends.

Figure 19:
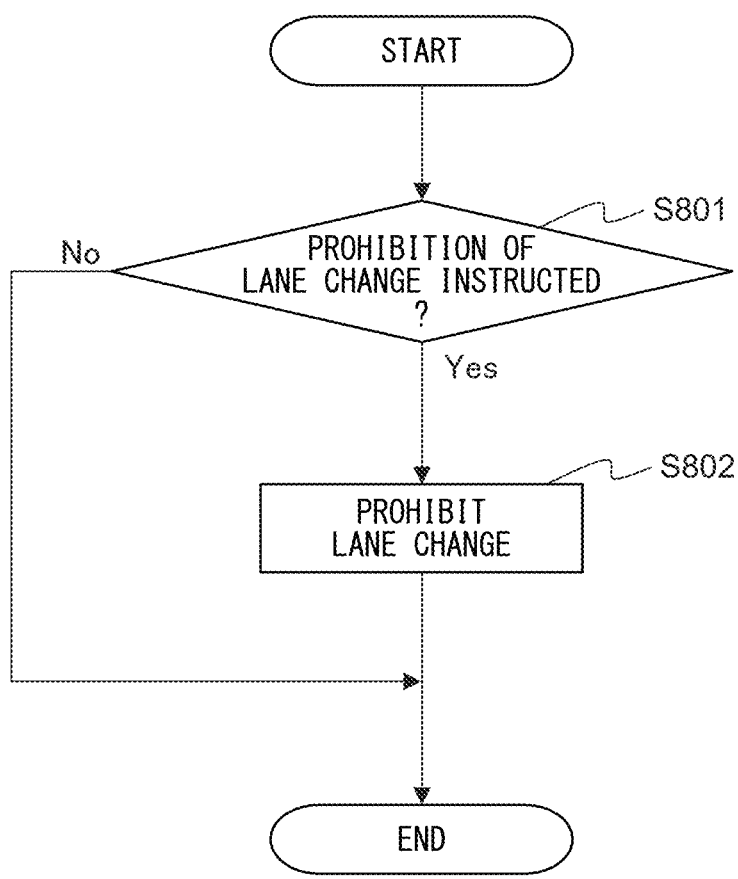
FIG. 19 is a flow chart showing a control routine carried out in a vehicle in a seventh embodiment.

FIG. 19 is a flow chart showing a control routine carried out in the vehicle 3" in the seventh embodiment. The present control routine is repeatedly performed by the processor 73 of the ECU 7.

First, at step S801, the lane change prohibiting part 74 judges whether prohibition of lane changing has been instructed from the server 8. Specifically, the lane change prohibiting part 74 judges whether a signal instructing prohibition of lane changing has been transmitted from the server 8 to the vehicle 3". If it is judged at step S801 that prohibition of lane changing is not instructed, the present control routine ends. On the other hand, if it is judged at step S801 that prohibition of lane changing is instructed, the present control routine proceeds to step S802.

At step S802, in the same way as step S104 of FIG. 6, the lane change prohibiting part 74 prohibits lane changing by the vehicle 3". After step S802, the present control routine ends.

Note that it may be judged whether lane changing by the vehicle 3" is allowed at the power supply apparatus 2 instead of the server 8, and the lane change prohibiting part 74 of the vehicle 3" may prohibit lane changing by the vehicle 3" based on the instruction from the power supply apparatus 2. In this case, the vehicle information of the vehicle 3" is transmitted from the vehicle 3" to the power supply apparatus 2 by near field wireless communication, and the control routine in FIG. 18 is performed by the processor 62 of the controller 6 of the power supply apparatus 2.

OTHER EMBODIMENTS

Above, preferred embodiments according to the present disclosure were explained, but the present disclosure is not limited to these embodiments and can be corrected and changed within the language of the claims. For example, the vehicle 3, 3', 3" may be a hybrid vehicle (HEV) or a plug-in hybrid vehicle (PHEV) provided with an internal combustion engine and a motor as power sources for driving.

Further, the above-mentioned embodiments may be combined in any way. For example, if the third embodiment is combined with the second embodiment, the fourth embodiment, the fifth embodiment, or the sixth embodiment, first, steps S301 and S302 of FIG. 10 are performed in the control routine of FIG. 8 (second embodiment), the control routine of FIG. 11 (fourth embodiment), the control routine in FIG. 13 (fifth embodiment), or the control routine of FIG. 15 (sixth embodiment).

Further, if the third embodiment is combined with the seventh embodiment, the SOC of the battery 32 is transmitted as vehicle information from the vehicle 3" to the server 8, and at the control routine of FIG. 18, steps S301 and S302 of FIG. 10 are performed between step S701 and step S702.

Further, if the sixth embodiment and the seventh embodiment are combined, if the judgement at step S801 in the control routine in FIG. 19 is affirmed, the lane change prohibiting part 74 of the vehicle 3" sets the lane changing prohibition flag F to 1 (step S604 of FIG. 15), and if the judgment at step S801 is denied, the lane change prohibiting part 74 of the vehicle 3" sets the lane changing prohibition flag F to 0 (step S605 of FIG. 15).

REFERENCE SIGNS LIST 2. power supply apparatus
3, 3', 3". vehicle
44. power transmission coil
7. electronic control unit (ECU)
73. processor
74. lane change prohibiting part

The invention claimed is:

1. A vehicle control device for controlling a vehicle configured to receive power by non-contact from a power transmission coil when passing over the power transmission coil, comprising: a processor configured to prohibit lane changing by the vehicle in a predetermined range up to an end point of a power supply area, where the power transmission coil is installed, when the vehicle is running in a lane of the power supply area,
wherein the lane changing by the vehicle is lane changing by manual driving of a driver of the vehicle and the processor is configured to prohibit the lane changing by obstructing operation of a steering wheel of the vehicle by the driver for the lane changing,
wherein the processor is configured to calculate a state of charge (SOC) of a battery of the vehicle,
and the processor is configured to prohibit the lane changing by the vehicle in the predetermined range when the SOC is less than a predetermined value and permit lane changing by the vehicle in the predetermined range when the SOC is equal to or greater than the predetermined value.

2. The vehicle control device according to claim 1, wherein the predetermined range includes a range from a start point of the power supply area to the end point of the power supply area.

3. The vehicle control device according to claim 1, wherein the predetermined range includes a range before the power supply area in a direction of advance of the vehicle.

4. The vehicle control device according to claim 1, wherein the processor is configured to notify the driver through an output device of the vehicle that the lane changing is prohibited in response to the processor prohibiting the lane changing.

5. The vehicle control device according to claim 4, wherein the processor is configured to notify the driver through the output device that the lane changing is prohibited when detecting operation of a turn signal of the vehicle by the driver.

6. The vehicle control device according to claim 4, wherein the processor is configured to acquire a positional relationship between the vehicle and a preceding vehicle running forward of the vehicle, and notify the driver through the output device that the lane changing is prohibited when a predetermined condition relating to the positional relationship is satisfied.

7. The vehicle control device according to claim 1, wherein the processor is configured to increase a force needed for turning of the steering wheel of the vehicle, when prohibiting the lane changing.

8. The vehicle control device according to claim 1, wherein
the vehicle is a vehicle that is platooning, and
the processor is configured to prohibit the lane changing by notifying the driver through the output device of the vehicle that line reorganization is prohibited.

9. The vehicle control device according to claim 8, wherein the processor is configured to notify the driver through the output device that the line reorganization is prohibited when the driver has requested the line reorganization.

10. The vehicle control device according to claim 1, wherein the processor is further configured to vibrate the steering wheel of the vehicle in response to an attempt to operate the steering wheel while the lane changing is prohibited.

11. The vehicle control device according to claim 1, wherein the processor is configured to permit the lane changing for making a passing maneuver when a predetermined passing condition is satisfied at a position outside the predetermined range, and prohibit the lane changing for making the passing maneuver when the passing condition is satisfied in the predetermined range.

12. The vehicle control device according to claim 1, wherein the processor is further configured to prohibit the lane changing by the vehicle in the predetermined range further based on satisfying a predetermined condition, and the predetermined condition includes a positional relationship between the vehicle and a preceding vehicle.

13. A vehicle control method for controlling a vehicle configured to receive power by non-contact from a power transmission coil when passing over the power transmission coil, including: prohibiting lane changing by the vehicle in a predetermined range up to an end point of a power supply area, where the power transmission coil is installed, when the vehicle is running in a lane of the power supply area,
wherein the lane changing by the vehicle is lane changing by manual driving of a driver of the vehicle and the prohibiting the lane changing comprises obstructing operation of a steering wheel of the vehicle by the driver for lane changing;
calculating a state of charge (SOC) of a battery of the vehicle;
and prohibiting the lane changing by the vehicle in the predetermined range when the SOC is less than a predetermined value and permit the lane changing by the vehicle in the predetermined range when the SOC is equal to or greater than the predetermined value.

14. The vehicle control method according to claim 13, wherein prohibiting the lane changing comprises increasing a force needed for turning of the steering wheel of the vehicle.

15. The vehicle control method according to claim 13, wherein the prohibiting lane changing by the vehicle in the predetermined range is further based on satisfying a predetermined condition, and the predetermined condition includes a positional relationship between the vehicle and a preceding vehicle.

16. A non-transitory recording medium having recorded thereon a computer program for controlling a vehicle configured to receive power by non-contact from a power transmission coil when passing over the power transmission coil, wherein the computer program causes a computer to prohibit lane changing by the vehicle in a predetermined range up to an end point of a power supply area, where the power transmission coil is installed, when the vehicle is running in a lane of the power supply area, wherein the lane changing by the vehicle is lane changing by manual driving of a driver of the vehicle and the computer is configured to prohibit the lane changing by obstructing operation of a steering wheel of the vehicle by the driver for lane changing, the computer program further causes the computer to:
calculate a state of charge (SOC) of a battery of the vehicle;
and prohibit the lane changing by the vehicle in the predetermined range when the SOC is less than a predetermined value and permit the lane changing by the vehicle in the predetermined range when the SOC is equal to or greater than the predetermined value.

17. The non-transitory computer readable medium according to claim 16, wherein prohibiting the lane changing by the computer comprises increasing a force needed for turning of the steering wheel of the vehicle.

18. The non-transitory computer readable medium according to claim 13, wherein the computer program further causes the computer to prohibit the lane changing by the vehicle in the predetermined range further based on satisfying a predetermined condition, and the predetermined condition includes a positional relationship between the vehicle and a preceding vehicle.

\* \* \* \* \*